(12) United States Patent
Yang et al.

(10) Patent No.: US 10,126,821 B2
(45) Date of Patent: Nov. 13, 2018

(54) INFORMATION PROCESSING METHOD AND INFORMATION PROCESSING DEVICE

(71) Applicants: BEIJING LENOVO SOFTWARE LTD., Beijing (CN); LENOVO (BEIJING) CO., LTD., Beijing (CN)

(72) Inventors: Yuanqing Yang, Beijing (CN); Weidong Wei, Beijing (CN); Lei Zhang, Beijing (CN); Donghai Shi, Beijing (CN)

(73) Assignees: BEIJING LENOVO SOFTWARE LTD., Beijing (CN); LENOVO (BEIJING) CO., LTD., Beijing (CN)

( * ) Notice: Subject to any disclaimer, the term of this patent is extended or adjusted under 35 U.S.C. 154(b) by 0 days.

(21) Appl. No.: 14/388,722

(22) PCT Filed: Dec. 18, 2013

(86) PCT No.: PCT/CN2013/089778
§ 371 (c)(1),
(2) Date: Sep. 26, 2014

(87) PCT Pub. No.: WO2014/094614
PCT Pub. Date: Jun. 26, 2014

(65) Prior Publication Data
US 2015/0286280 A1    Oct. 8, 2015

(30) Foreign Application Priority Data

Dec. 20, 2012  (CN) .......................... 2012 1 0559888
Dec. 20, 2012  (CN) .......................... 2012 1 0560705
(Continued)

(51) Int. Cl.
*G06F 3/01* (2006.01)
*H04N 7/14* (2006.01)
*G06F 3/0484* (2013.01)

(52) U.S. Cl.
CPC .......... *G06F 3/017* (2013.01); *G06F 3/04845* (2013.01); *H04N 7/147* (2013.01)

(58) Field of Classification Search
CPC .................... G06F 3/017; H04N 7/141–7/148
(Continued)

(56) References Cited

U.S. PATENT DOCUMENTS

2004/0171372 A1    9/2004  Tokudome
2008/0215884 A1*   9/2008  Yonemoto .............. H04N 7/147
                                                         713/168
(Continued)

FOREIGN PATENT DOCUMENTS

CN            1396738           2/2003
CN          101015208 A         8/2007
(Continued)

OTHER PUBLICATIONS

Beijing Lenovo Software Ltd. et al., English Translation of the Patent Cooperation Treaty (PCT) International Preliminary Report on Patentability and PCT Written Opinion of the International Searching Authority for International Patent Application No. PCT/CN2013/089778, dated Jun. 23, 2015, The International Bureau of WIPO, Switzerland; 8 pages.
(Continued)

*Primary Examiner* — Michael Pervan
(74) *Attorney, Agent, or Firm* — Brinks Gilson & Lione; John C. Freeman

(57) ABSTRACT

Provided in an embodiment of the present invention are an information processing method and information processing device applied to a server. The information processing method comprises acquiring, in the communication process between a first electronic apparatus and a second electronic apparatus, the generated communication information from the first electronic apparatus and/or the second electronic
(Continued)

apparatus; determining a processed object based on the communication information; analyzing the processed object to acquire correlation information associated with the processed object; and executing an operation based on the correlation information.

16 Claims, 4 Drawing Sheets

(30) Foreign Application Priority Data

Dec. 20, 2012 (CN) .......................... 2012 1 0560726
Dec. 20, 2012 (CN) .......................... 2012 1 0560832

(58) Field of Classification Search
USPC .......................................... 345/1.1, 2.1–2.3
See application file for complete search history.

(56) References Cited

U.S. PATENT DOCUMENTS

| | | | |
|---|---|---|---|
| 2009/0115835 A1* | 5/2009 | Shaffer | H04N 7/15 348/14.08 |
| 2009/0157426 A1* | 6/2009 | Malec | G06Q 10/10 705/3 |
| 2012/0131462 A1 | 5/2012 | Chen | |
| 2012/0302167 A1 | 11/2012 | Yun et al. | |
| 2013/0342637 A1* | 12/2013 | Felkai | H04N 7/14 348/14.08 |

FOREIGN PATENT DOCUMENTS

| | | |
|---|---|---|
| CN | 101015208 A | 8/2007 |
| CN | 101296450 | 10/2008 |
| CN | 101888519 | 11/2010 |
| CN | 101888519 A | 11/2010 |
| CN | 102479024 | 5/2012 |
| CN | 102655544 A | 9/2012 |
| JP | 2002271507 | 9/2002 |
| JP | 2003158729 | 5/2003 |

OTHER PUBLICATIONS

International Search Report corresponding to PCT/CN2013/089778 dated Mar. 20, 2014; 7 pages.
First Office Action dated Aug. 17, 2016 out of Chinese priority Application No. 201210559888.3 (13 pages including English translation).
First Office Action dated Jul. 4, 2016 out of Chinese priority Application No. 201210560832.X (13 pages including English translation).
First Office Action dated Jul. 19, 2016 out of Chinese priority Application No. 201210560705.X (8 pages including English translation).
First Office Action dated Jul. 20, 2016 out of Chinese priority Application No. 201210560726.1 (13 pages including English translation).
Office Action, and English language translation thereof, in corresponding Chinese Application No. 201210560705.X, dated Feb. 4, 2017, 14 pages.
Office Action, and English language translation thereof, in corresponding Chinese Application No. 201210560832.X, dated Jan. 16, 2017, 14 pages.
Office Action, and English language translation thereof, in corresponding Chinese Application No. 201210560726.1, dated Apr. 5, 2017, 11 pages.
Office Action, and English language translation thereof, in corresponding Chinese Application No. 201210560832.X, dated Apr. 14, 2017, 12 pages.
Office Action, and English language translation thereof, in corresponding Chinese Application No. 201210560705.X, dated May 2, 2017, 14 pages.
Office Action, and English language translation thereof, in corresponding Chinese Application No. 201210559888.3, dated May 11, 2017, 16 pages.
Third Office Action dated Oct. 9, 2017 (12 pages including English translation) from Chinese priority Application No. 201210560726.1.
Third Office Action dated Oct. 24, 2017 (13 pages including English translation) from Chinese priority Application No. 201210559888.3.

* cited by examiner

INFORMATION PROCESSING METHOD AND INFORMATION PROCESSING DEVICE

CROSS REFERENCE TO RELATED APPLICATIONS

This application is a national phase application based on international application number PCT/CN2013/089778, filed on Dec. 18, 2013, which claims priority of Chinese Patent Application No. 201210560832.X, filed on Dec. 20, 2012, Chinese Patent Application No. 201210560726.1, filed on Dec. 20, 2012, Chinese Patent Application No. 201210559888.3, filed on Dec. 20, 2012, and Chinese Patent Application No. 201210560705.X, filed on Dec. 20, 2012, all of which are incorporated by reference herein in their entireties.

BACKGROUND

The present disclosure relates to a field of information processing, more particularly, the present disclosure relates to an information processing method and an information processing apparatus.

With the development of communication technology, communication applications including text communication, voice communication and video communication or the like become more and more popular. In procedures of these communications, large amounts of data such as text data, voice data, video data or the like are generated.

Conventionally, other than simply forwarding the data to a corresponding communicating party to implement an object of the communication in the procedure of the communication, the data is not further used.

SUMMARY

In consideration of above case, the present disclosure provides an information processing method and an information processing apparatus which are able to use communication information generated in the procedure of a communication to, for example, generate association information which is relevant to the communicating party, so as to further improve the application value of the communication and enhance the user's experience.

One embodiment provides an information processing method is applied in a first electronic apparatus. The information processing method includes determining a processing object based on communication information generated based on the communication in a procedure in which the first electronic apparatus communicates with a second electronic apparatus; acquiring association information associated with the processing object; and executing an operation based on the association information.

Acquiring the association information associated with the processing object includes transmitting the processing object to a remote server; and receiving the association information from the remote server. The association information is information associated with the processing object and obtained by analyzing the processing object by the remote server.

Acquiring the association information associated with the processing object includes analyzing the processing object to determine the association information.

The communication information is video pictures, and determining the processing object includes detecting an input operation of a user; and determining the processing object from the video picture based on the input operation.

Detecting the input operation of the user includes detecting an input operation for selecting a region in the video picture; and determining the processing object includes determining a part of the video picture corresponding to the region in the video picture as the processing object.

Detecting the input operation of the user includes detecting a click operation for clicking the video picture; and determining the processing object includes executing image partition to the video picture based on a specific position in the video picture corresponding to the click operation to obtain a partial video picture including the specific position; and determining the partial video picture as the processing object.

Detecting the input operation of the user includes executing image recognition to the video picture to determine a plurality of candidate objects; detecting a selection operation of at least one candidate object in the plurality of candidate objects by the user; and determining the processing object includes determining the selected at least one candidate object as the processing object based on the selection operation.

The communication information is information of a static picture, and determining the processing object further includes executing image recognition to the static picture to divide the static picture into a plurality of regions; determining a target region from the plurality of regions based on predetermined criteria; and determining the processing object based on the target region.

The communication information is information of a dynamic picture, and determining the processing object further includes executing image recognition to the dynamic picture to recognize a specific action performed by the user in the procedure of the communication; and determining the processing object based on the specific action.

The communication information is audio information, and determining the processing object includes executing audio recognition to the audio to determine the processing object.

Determining the processing object further includes determining a plurality of candidate object based on the communication information; detecting a selection operation of at least one candidate objects in the plurality of candidate objects by the user; and determining the selected at least one candidate object as the processing object based on the selection operation.

Another embodiment provides an information processing apparatus applied in a first electronic apparatus. The information processing apparatus includes a determining unit for determining a processing object based on communication information generated based on a communication in a procedure in which the first electronic apparatus communicates with a second electronic apparatus; an acquiring unit for acquiring association information associated with the processing object; and an executing unit for executing an operation based on the association information.

The acquiring unit includes a transmitting unit for transmitting the processing object to a remote server; and a receiving unit for receiving the association information from the remote server. The association information is information associated with the processing object and obtained by analyzing the processing object by the remote server.

The acquiring unit includes an analyzing unit for analyzing the processing object to determine the association information.

The communication information is information of a video picture, and the determining unit includes a detecting unit for detecting an input operation of a user; and a first processing object determining unit for determining the processing object from the video picture based on the input operation.

The detecting unit is configured to detect an input operation for selecting a region in the video picture; and the first processing object determining unit is configured to determine a partial video picture corresponding to the region in the video picture as the processing object.

The detecting unit is configured to detect a click operation for clicking the video picture; and the first processing object determining unit includes an image dividing unit for executing image partition to the video picture based on a specific position in the video picture corresponding to the click operation to obtain a partial video picture including the specific position; and an object determining unit for determining the partial video picture as the processing object.

The detecting unit includes a recognizing unit for executing image recognition to the video picture to determine a plurality of candidate objects; a selection detecting unit for detecting a selection operation of at least one candidate object in the plurality of candidate objects by the user; and the first processing object determining unit is configured to determine the selected at least one candidate object as the processing object based on the selection operation.

The communication information is information of a static picture, and the determining unit further includes a static picture recognizing unit for executing image recognition to the static picture to divide the static picture into a plurality of regions; a target region determining unit for determining a target region from the plurality of regions based on predetermined criteria; and a second processing object determining unit for determining the processing object based on the target region.

The communication information is information of a dynamic picture, and the determining unit further includes a dynamic picture recognizing unit for recognizing the dynamic picture to recognize a specific action performed by the user in the procedure of the communication; and a third processing object determining unit for determining the processing object based on the specific action.

The communication information is audio information, and the determining unit includes an audio recognizing unit for executing audio recognition for the audio to determine the processing object.

The determining unit further includes a candidate object determining unit for determining a plurality of candidate objects based on the communication information; a selection detecting unit for detecting a selection operation of at least one candidate object in the plurality of candidate objects by the user; and a fourth processing object determining unit for determining the selected at least one candidate object as the processing object based on the selection operation.

Yet another embodiment provides an information processing method applied in a server. The information processing method includes acquiring communication information generated by a communication from a first electronic apparatus and/or a second electronic apparatus in a procedure in which the first electronic apparatus communicates with the second electronic apparatus; determining the processing object based on the communication information; analyzing the processing object to acquire association information associated with the processing object; and executing an operation based on the association information.

The communication information is information of a video picture, and determining the processing object includes receiving input track information transmitted by at least one of the first electronic apparatus and the second electronic apparatus, where the input track information is generated by detecting an input operation of a user by at least one of the first electronic apparatus and the second electronic apparatus; and determining the processing object based on the input track information.

The input track information is obtained by detecting an input operation for selecting a region in the video picture by at least one of the first electronic apparatus and the second electronic apparatus, and determining the processing object includes determining a part of the video picture corresponding to the region in the video picture as the processing object.

The input track information is obtained by detecting a click operation for clicking the video picture by at least one of the first electronic apparatus and the second electronic apparatus, and determining the processing object includes executing image partition for the video picture based on a specific position in the video picture corresponding to the click operation to obtain a partial video picture including the specific position; and determining the partial video picture as the processing object.

The information processing method further includes executing image recognition to the video picture to determine a plurality of candidate objects; and transmitting the plurality of candidate objects to at least one of the first electronic apparatus and the second electronic apparatus. The input track information is obtained by detecting a selection operation of the at least one candidate object in the plurality of candidate objects of the user by the at least one of the first electronic apparatus and the second electronic apparatus; and determining the processing object further includes determining the selected at least one candidate object as the processing object based on the selection operation.

The communication information is information of the video picture, and determining the processing object includes executing image recognition for the video picture to divide the video picture into a plurality of regions; determining a target region from the plurality of regions based on predetermined criteria; and determining the processing object based on the target region.

The communication information is information of a dynamic picture, and determining the processing object further includes executing image recognition to the dynamic picture to recognize a specific action performed by an object in the dynamic picture in the procedure of the communication; and determining the processing object based on the specific action.

The communication information is audio information, and determining the processing object includes executing audio recognition to the audio to determine the processing object.

Determining the processing object further includes determining a plurality of candidate objects based on the communication information; transmitting the plurality of candidate objects to at least one of the first electronic apparatus and the second electronic apparatus; receiving selection information for selecting at least one candidate object by the user of the at least one of the first electronic apparatus and the second electronic apparatus; and determining the selected at least one candidate object as the processing object based on the selection information.

Object information of a plurality of objects is pre-stored in the server, and the object information of each object is stored associated with attribute information for representing the attribute of the object; and acquiring the association information associated with the processing object includes analyzing the processing object to determine the attribute of the processing object; determining corresponding attribute information in the stored attribute information based on the attribute of the processing object; and determining the object information associated with the corresponding attribute information as the association information.

Yet another embodiment provides an information processing apparatus applied in a server. The information processing apparatus includes a communication information acquiring unit for acquiring communication information generated by a communication from the first electronic apparatus and/or the second electronic apparatus in a procedure in which the first electronic apparatus communicates with the second electronic apparatus; a determining unit for determining the processing object based on the communication information; an association information acquiring unit for analyzing the processing object to acquire the association information associated with the processing object; and an executing unit for executing an operation based on the association information.

The communication information is information of a video picture, and the determining unit includes a receiving unit for receiving input track information transmitted by at least one of the first electronic apparatus and the second electronic apparatus, where the input track information is generated by detecting an input operation of the user by at least one of the first electronic apparatus and the second electronic apparatus; and a first processing object determining unit for determining the processing object based on the input track information.

The input track information is obtained by detecting an input operation for selecting a region in the video picture by at least one of the first electronic apparatus and the second electronic apparatus; and the first processing object determining unit is configured to determine a partial video picture corresponding to the region in the video picture as the processing object.

The input track information is obtained by detecting a click operation for clicking the video picture by at least one of the first electronic apparatus and the second electronic apparatus; and the first processing object determining unit includes an image dividing unit for executing image partition for the video picture based on a specific position in the video picture corresponding to the click operation to obtain a partial video picture including the specific position; and an object determining unit for determining the partial video picture as the processing object.

The information processing apparatus further includes a recognizing unit for executing image recognition for the video picture to determine a plurality of candidate objects; and a transmitting unit for transmitting the plurality of candidate objects to at least one of the first electronic apparatus and the second electronic apparatus. The input track information is obtained by detecting a selection operation of the at least one candidate object in the plurality of candidate objects of the user by the at least one of the first electronic apparatus and the second electronic apparatus; and the first processing object determining unit is configured to determine the selected at least one candidate object as the processing object based on the selection operation.

The communication information is information of a static picture, and the determining unit includes a static picture recognizing unit for executing image recognition to the static picture to divide the static picture into a plurality of regions; a target region determining unit for determining a target region from the plurality of regions based on predetermined criteria; and a second processing object determining unit for determining the processing object based on the target region.

The communication information is information of a dynamic picture, and the determining unit includes a dynamic picture recognizing unit for recognizing the dynamic picture to recognize a specific action performed by an object in the dynamic picture in the procedure of the communication; and a third processing object determining unit for determining the processing object based on the specific action.

The communication information is audio information, and the determining unit includes an audio recognizing unit for executing audio recognition to the audio to determine the processing object.

The determining unit further includes a candidate object determining unit for determining a plurality of candidate objects based on the communication information; a transmitting unit for transmitting the plurality of candidate objects to at least one of the first electronic apparatus and the second electronic apparatus; a receiving unit for receiving selection information for selecting at least one candidate object by the user of the at least one of the first electronic apparatus and the second electronic apparatus; and a fourth processing object determining unit for determining the selected at least one candidate object as the processing object based on the selection information.

Object information of a plurality of objects is pre-stored in the server, and the object information of each object is stored associated with attribute information for the representing attribute of the object; and the association information acquiring unit includes an attribute determining unit for analyzing the processing object to determine the attribute of the processing object; an attribute information determining unit for determining corresponding attribute information in the stored attribute information based on the attribute of the processing object; and an object information determining unit for determining object information associated with the corresponding attribute information.

Yet another embodiment provides an information processing method applied in a first electronic apparatus. The information processing method includes determining a processing object based on communication information generated based on a communication in a procedure in which the first electronic apparatus executes a multimedia communication with a second electronic apparatus; acquiring association information associated with the processing object; and executing an operation based on the association information.

Acquiring the association information associated with the processing object includes transmitting the processing object to a remote server; and receiving the association information from the remote server; the association information is information associated with the processing object and obtained by analyzing the processing object by the remote server.

Acquiring the association information associated with the processing object includes analyzing the processing object to determine the association information.

Executing the operation based on the association information includes generating a prompt icon for prompting the user to view, where the prompt icon is for linking to the association information; and displaying the prompt icon.

The communication is a voice communication, and executing the operation based on the association information includes detecting whether the first electronic apparatus is connected to a display device; and outputting the association information to the display device when it detects that the first electronic apparatus is connected to a display device; the display device displays based on the association information.

The communication is a video communication, and executing the operation based on the association information includes combining an image based on the association information and an image of the video communication to generate a combined image; and displaying the combined image.

Executing the operation based on the association information includes at least one of the following displaying the association information; storing the association information; and transmitting the association information to at least one of the remote server and the second electronic apparatus.

After storing the association information, the information processing method further includes deciding whether the current time satisfies a first predetermined condition; and executing a display based on the association information when it decides that the current time satisfies the first predetermined condition.

After storing the association information, the information processing method further includes deciding whether a network access satisfies a second predetermined condition when the first electronic apparatus executes the network access; and executing the display based on the association information when it decides that the network access satisfies the second predetermined condition.

After storing the association information, the information processing method further includes detecting environmental information of the first electronic apparatus; deciding whether the environmental information satisfies a third predetermined condition; and executing the display based on the association information when it decides that the environmental information satisfies the third predetermined condition.

Executing the display based on the association information includes displaying at least one of the association information and the prompt icon, wherein the prompt icon is for linking to the association information.

Yet another embodiment provides an information processing apparatus applied in a first electronic apparatus. The information processing apparatus includes a determining unit for determining a processing object based on communication information generated based on a communication in a procedure in which the first electronic apparatus executes a multimedia communication with a second electronic apparatus; an acquiring unit for acquiring association information associated with the processing object; and an executing unit for executing an operation based on the association information.

The acquiring unit includes a transmitting unit for transmitting the processing object to a remote server; and a receiving unit for receiving the association information from the remote server; the association information is information associated with the processing object and obtained by analyzing the processing object by the remote server.

The acquiring unit includes an analyzing unit for analyzing the processing object to determine the association information.

The executing unit includes an icon generating unit for generating a prompt icon for prompting the user to view, where the prompt icon is for linking to the association information; and an icon displaying unit for displaying the prompt icon.

The communication is a voice communication, and the executing unit includes a first detecting unit for detecting whether the first electronic apparatus is connected to a display device; and an outputting unit for outputting the association information to the display device when it detects that the first electronic apparatus is connected to a display device; the display device displays based on the association information.

The communication is a video communication, and the executing unit includes a combining unit for combining an image based on the association information and an image of the video communication to generate a combined image; and a combined image displaying unit for displaying the combined image.

The executing unit is configured to execute at least one of the following displaying the association information; storing the association information; and transmitting the association information to at least one of the remote server and the second electronic apparatus.

In case that the executing unit is configured to store the association information, the executing unit further includes a first deciding unit for deciding whether the current time satisfies a first predetermined condition after storing the association information; and the executing unit is configured to execute a display based on the association information when it decides that the current time satisfies the first predetermined condition.

In case that the executing unit is configured to store the association information, the executing unit further includes a second deciding unit for deciding whether a network access satisfies a second predetermined condition when the first electronic apparatus executes the network access after storing the association information; and the executing unit is configured to execute a display based on the association information when it decides that the network access satisfies the second predetermined condition.

In case that the executing unit is configured to store the association information, the information processing apparatus further includes an environmental information detecting unit for detecting environmental information of the first electronic apparatus after storing the association information; and a third deciding unit for deciding whether the environmental information satisfies a third predetermined condition; and the executing unit is configured to execute a display based on the association information when it decides that the environmental information satisfies the third predetermined condition.

The executing unit is configured to display at least one of the association information and the prompt icon; the prompt icon is for linking to the association information.

Yet another embodiment provides an information processing method applied in a server. The information processing method includes acquiring communication information generated by a communication from a first electronic apparatus and/or a second electronic apparatus in a procedure in which the first electronic apparatus communicates with the second electronic apparatus; determining the processing object based on the communication information; analyzing the processing object to acquire association information associated with the processing object; and executing an operation based on the association information.

Executing the operation based on the association information includes at least one of the following: storing the association information; and transmitting the association information to at least one of the first electronic apparatus and the second electronic apparatus based on a predetermined strategy.

Transmitting the association information to the first electronic apparatus or the second electronic apparatus based on the predetermined strategy includes receiving a request from at least one of the first electronic apparatus and the second electronic apparatus; and transmitting the association information to the electronic apparatus which makes the request in the first electronic apparatus and the second electronic apparatus in response to the request.

Transmitting the association information to the first electronic apparatus or the second electronic apparatus based on the predetermined strategy includes transmitting the association information to the electronic apparatus, which transmits the communication information in the first electronic apparatus and the second electronic apparatus.

The communication information includes audio information, and transmitting the association information to the first electronic apparatus or the second electronic apparatus based on the predetermined strategy includes executing a semantic analysis to the audio to determine the association information is appropriate for which one of the first electronic apparatus and the second electronic apparatus; and transmitting the association information to the electronic apparatus which is determined as appropriate in the first electronic apparatus and the second electronic apparatus.

Object information of a plurality of objects is pre-stored in the server, and the object information of each object is stored associated with attribute information for representing the attribute of the object; and acquiring the association information associated with the processing object includes analyzing the processing object to determine the attribute of the processing object; determining corresponding attribute information in the stored attribute information based on the attribute of the processing object; and determining the object information associated with the corresponding attribute information as the association information.

Yet another embodiment provides an information processing apparatus applied in a server. The information processing apparatus includes a communication information acquiring unit for acquiring communication information generated by a communication from the first electronic apparatus and/or the second electronic apparatus in a procedure in which the first electronic apparatus communicates with the second electronic apparatus; a determining unit for determining the processing object based on the communication information; an analyzing unit for analyzing the processing object to acquire the association information associated with the processing object; and an executing unit for executing an operation based on the association information.

The executing unit is configured to execute at least one of the following: storing the association information; and transmitting the association information to at least one of the first electronic apparatus and the second electronic apparatus based on a predetermined strategy.

In case that the executing unit is configured to transmit the association information to the first electronic apparatus or the second electronic apparatus based on the predetermined strategy, the executing unit includes a receiving unit for receiving a request from at least one of the first electronic apparatus and the second electronic apparatus; and a transmitting unit for transmitting the association information to the electronic apparatus which makes the request in the first electronic apparatus and the second electronic apparatus in response to the request.

In case that the executing unit is configured to transmit the association information to the first electronic apparatus or the second electronic apparatus based on the predetermined strategy, the executing unit is configured to transmit the association information to the electronic apparatus, which transmits the communication information in the first electronic apparatus and the second electronic apparatus.

The communication information includes audio information. In case that the executing unit is configured to transmit the association information to the first electronic apparatus or the second electronic apparatus based on the predetermined strategy, the executing unit includes a semantic analyzing unit for executing semantic analysis to the audio to determine the association information is appropriate for which one of the first electronic apparatus and the second electronic apparatus; and a transmitting unit for transmitting the association information to the electronic apparatus which is determined as appropriate in the first electronic apparatus and the second electronic apparatus.

Object information of a plurality of objects is pre-stored in the server, and the object information of each object is stored associated with attribute information for representing the attribute of the object; and the acquiring unit includes an attribute determining unit for analyzing the processing object to determine the attribute of the processing object; an attribute information determining unit for determining corresponding attribute information in the stored attribute information based on the attribute of the processing object; and an object information determining unit for determining object information associated with the corresponding attribute information as the association information.

In the information processing method and the information processing apparatus of the embodiments, the processing object is determined based on the communication information generated by the communication, and the association information associated with the processing object is acquired, so that the operation based on the association information such as displaying, storing, or forwarding or the like can be executed. Thus, with the information processing method and the information processing apparatus of the embodiments, the communication information generated in the procedure of the communication can be used, so that, in addition to implementing the object of the communication, it can further improve the application value of the communication, and enhance the user's experience greatly.

DETAILED DESCRIPTION

Figure 1:
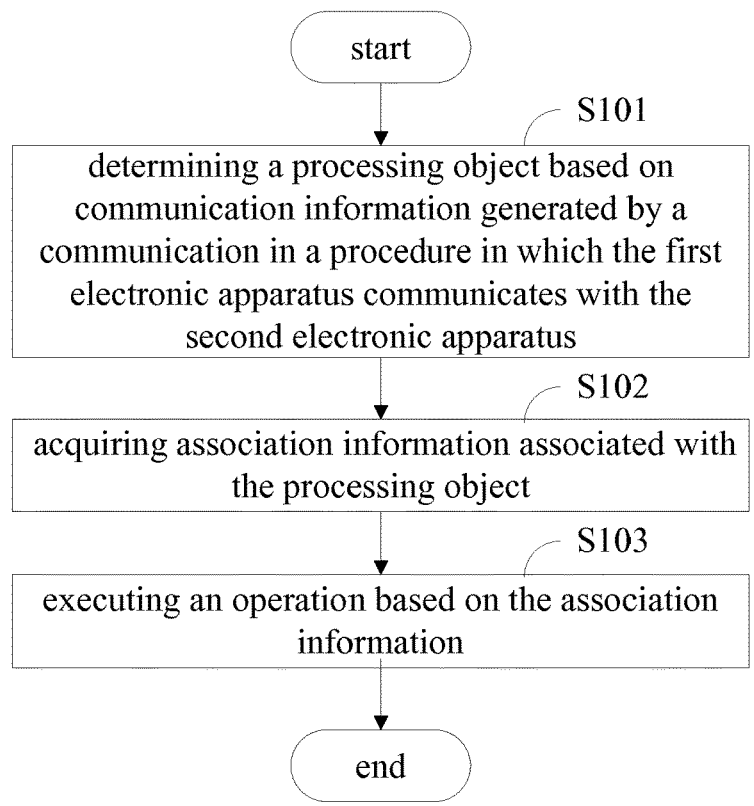
FIG. 1 is a flow chart illustrating the information processing method of a first implementation mode according to the present disclosure.

The embodiments are described in detail with reference to the accompanying drawings hereinafter.

The information processing method and the information processing apparatus of the embodiments are applied in an environment in which the first electronic apparatus communicates with the second electronic apparatus. The first electronic apparatus and the second electronic apparatus may be an electronic apparatus having the function of communication such as a fixed telephone, a mobile phone, a tablet computer, a personal computer, or the like. The communication may be a conventional voice communication (for example through a fixed telephone), may be a video communication (for example through an application of video chat), or may be a text communication (for example through an application of instant messaging (a text chat)). The first electronic apparatus and the second electronic apparatus may be of the same type, or they may be different.

Further, the communication between the first electronic apparatus and the second electronic apparatus may be executed through a server (hereinafter referred to as a remote server as appropriate) via a network such as the internet. That is, one of the first electronic apparatus and the second electronic apparatus sends communication information to the server, and the server forwards the communication information to the other of the first electronic apparatus and the second electronic apparatus. Of course, the communication between the first electronic apparatus and the second electronic apparatus may also be executed without forwarding through the server.

In the following description, the embodiments are described by taking the communication between the two electronic apparatus of the first electronic apparatus and the second electronic apparatus as an example. However, those skilled in the art can understand that the information processing method and the information processing apparatus of the embodiments may be applied in a scenario in which more than two electronic apparatus communicate with each other.

Further, the information processing method and the information processing apparatus of the embodiments may be applied in any one of the first electronic apparatus and the second electronic apparatus, and may also be applied in the server. Hereinafter, the information processing method and the information processing apparatus in the above-described various kinds of cases are described respectively.

(A First Implementation Mode)

In the first implementation mode of the present disclosure, the information processing method is applied in either or both of the first electronic apparatus and the second electronic apparatus. Hereinafter, it assumes that the information processing method is applied in the first electronic apparatus.

Hereinafter, the information processing method according to the embodiment is described with reference to FIG. 1. When the information processing method of the embodiments starts, the first electronic apparatus and the second electronic apparatus are in a procedure of communication.

As shown in FIG. 1, first, at step S101, the information processing method determines a processing object based on communication information generated by the communication.

The determination of the processing object may be implemented by detecting an input operation executed by the user actively, and may also be implemented by analyzing and recognizing the communication information automatically by the information processing method.

In particular, in an embodiment, the communication includes a video communication, and the communication information includes information of a video picture. In this case, the user specifies the processing object by executing an input operation to the video picture. Correspondingly, the information processing method of the embodiments determines the processing object specified by the user by detecting the input operation executed to the video picture by the user.

More particularly, for example, in the first example, the user can select a region in the video picture. Correspondingly, the information processing method of the embodiments detects the input operation for selecting a region in the video picture. Then the information processing method determines a part of the video picture corresponding to the region in the video picture as the processing object.

In a second example, the user may click a specific position in the video picture. Correspondingly, the information processing method of the embodiments detects a click operation for clicking the video picture.

Then, the information processing method executes image partition to the video picture based on the specific position in the video picture corresponding to the click operation to obtain a partial video picture including the specific position. The technique of the information processing method executing the image partition to the video picture is known by those skilled in the art, and it is not described in detail here.

After obtaining the partial video picture including the specific position, the information processing method determines the partial video picture as the processing object.

In the third example, the information processing method may execute image recognition to the video picture to determine a plurality of candidate objects initially. The information processing method may adopt various kinds of image recognition algorithm known conventionally to determine the candidate object, and it is not described in detail here.

After determining the plurality of candidate objects, the information processing method may present the information about the candidate object to the user to be selected by the user. Then the information processing method detects a selection operation of at least one candidate object in the plurality of candidate objects by the user. In addition, the information processing method determines the selected at least one candidate object as the processing object based on the selection operation when it detects the selection operation of the at least one candidate object by the user.

Various methods of determining the processing object by the input operation executed by the user actively are described above. Hereinafter, a method of determining the processing object by analyzing and recognizing the communication information automatically is described.

More particularly, in the first example, the communication information includes information of a static picture. In this case, the information processing method executes image recognition to the static picture to divide the static picture into a plurality of regions. For example, the information processing method divides the static picture into several separate regions according to features such as gradation, color, space texture, geometric shape or the like, so that these features show consistency or similarity in a same region, and show obvious differences between different regions. The information processing method may adopt various kinds of algorithm such as a method based on threshold, a method based on clustering, a method based on region and border, a method based on global optimization or the like to execute the image partition. Of course, the above-described algorithms of image partition are only examples; those skilled in the art can adopt various kinds of algorithms to execute the image partition, which are not described in detail here.

Then the information processing method determines a target region from the plurality of regions based on predetermined criteria. For example, the information processing method may determine the target region from the plurality of regions based on the significance of a plurality of regions, interesting degree of the user trained in advance, criteria of positions of the regions or areas of the regions or the like. Of course, the above-described criteria of determining the target region and the corresponding algorithms are only examples. The information processing method of the embodiments can adopt various other kinds of criteria and corresponding algorithms known by those skilled in the art to determine the target region, which are not described in detail here.

After determining the target region, the information processing method determines the processing object based on the target region. In particular, for example, the information processing method may analyze the video picture of the target region to determine the processing object. For example, the information processing method may determine the processing object by recognizing the video picture of the target region to determine the kinds of object thereof. In addition, for example, the information processing method may determine the processing object by executing blur match between the video picture of the target region and the images stored in an information bank in advance. Of course, the above-described methods of determining the processing object based on the target region are only examples. The information processing method of the embodiments can adopt various other methods known by those skilled in the art to determine the processing object, which are not described in detail here.

In the second example, the communication information includes information of a dynamic picture. In this case, the information processing method may recognize the dynamic picture to recognize a specific action performed by the user in the procedure of the communication. For example, the information processing method can execute a recognition similar to the above to the dynamic picture constituent of a plurality of frames, which are continuous in time, so as to recognize an action performed by the user in this time period.

Then the information processing method can determine the processing object based on the specific actions, for example according to the specific action based on a table of association relationship between the pre-stored action and the processing object.

In the third example, the communication information includes audio information. In this case, the information processing method can execute audio recognition to the audio to determine the processing object.

More particularly, for example, the information processing method can decide whether there is an audio segment matched with a predetermined keyword in the audio. At the time of deciding that there is the audio segment matched with the predetermined keyword in the audio, the information processing method determines the audio segment as the processing object.

In addition, for example, the information processing method executes the semantic analysis to the audio and determines the processing object based on the result of the semantic analysis.

Of course, the information processing method can adopt various kinds of algorithms known conventionally to execute the audio recognition to the audio, which are not described in detail here.

Further, as with the above-mentioned, the information processing method of the embodiments may combine an active input of the user and an automatic recognition of the electronic apparatus. In particular, in the fourth example, the information processing method may determine a plurality of candidate objects based on the communication information. Then the information processing method may present the plurality of candidate objects to the user, and detect a selection operation of at least one of the plurality of candidate objects by the user. Then the information processing method determines the selected at least one candidate object as the processing object based on the selection operation.

Further, in a fifth example, the communication information includes text information. In this case, the information processing method can execute text recognition to the text to determine the processing object.

More particularly, for example, the information processing method can decide whether there is a text segment matched with a predetermined keyword in the text. At the time of deciding that there is the text segment matched with the predetermined keyword in the text, the information processing method determines the text segment as the processing object.

In addition, for example, the information processing method executes the semantic analysis to the text and determines the processing object based on the result of the semantic analysis.

Of course, the information processing method can adopt various kinds of algorithms known conventionally to execute the text recognition to the text, and which are not described in detail here.

With the above-described processing, in step S101, the information processing method determines the processing object based on the communication information generated by the communication.

Then, in step S102, the information processing method acquires association information associated with the processing object.

In particular, in one embodiment, the information processing method may transmit the processing object to the remote server, so that the processing object is analyzed by the remote server. Then the information processing method receives the association information from the remote server. The association information is information associated with the processing object and obtained by analyzing the processing object by the remote server.

The remote server may acquire the association information by various kinds of methods. As an example, object information of a plurality of objects is pre-stored in the remote server, and the object information of each object is stored associated with attribute information. The attribute information is for representing attributes of an object such as clothing, building, or the like.

After receiving the processing object transmitted by the information processing method, the remote server analyzes the processing object to determine the attribute of the processing object. Then the remote server determines corresponding attribute information in the stored attribute information based on the attribute of the processing object, and determines the object information associated with the corresponding attribute information as the association information.

In another embodiment, the information processing method may analyze the processing object locally to determine the association information. In this case, the information processing method may store the object information and the attribute information of the plurality of objects associated locally in advance.

After determining the processing object, the information processing method analyzes the processing object to determine the attribute of the processing object. Then, the information processing method determines corresponding attribute information in the stored attribute information based on the attribute of the processing object, and determines the object information associated with the corresponding attribute information as the association information.

After determining the association information, in step S103, the information processing method executes an operation based on the association information.

Hereinbefore, the information processing method of the first implementation mode according to the present disclosure is described.

In the information processing method according to the first implementation mode of the present disclosure, the processing object is determined based on the communication information generated by the communication and the association information associated with the processing object is acquired, and the operation based on the association information is executed.

Thus, with the information processing method of the first implementation mode of the present disclosure, the communication information generated in the procedure of the communication can be used; therefore, in addition to implementing the object of communication, it can further improve the application value of the communication, and enhance the user's experience greatly.

Further, in the information processing method of the first implementation mode of the present disclosure, at a terminal side (i.e., a side of the first electronic apparatus and/or the second electronic apparatus), the processing object can be determined in response to the input operation of the user or automatically based on the communication information, and the above-described two manners can be combined.

Therefore, with the information processing method of the first implementation mode of the present disclosure, there are provided multiple ways to use the communication information, so as to further enhance the user's experience.

Hereinafter, the information processing apparatus applied in at least one of the first electronic apparatus and the second electronic apparatus is described with reference to FIG. 2. In the following description, it is assumed that the information processing apparatus is applied in the first electronic apparatus.

Figure 2:
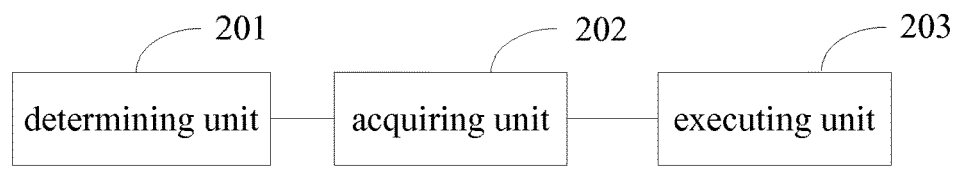
FIG. 2 is a block diagram illustrating the main configuration of the information processing apparatus of the first implementation mode according to the present disclosure.

As shown in FIG. 2, an information processing apparatus 200 according to the first implementation mode of the present disclosure includes a determining unit 201, an acquiring unit 202, and an executing unit 203.

The determining unit 201 determines the processing object based on the communication information generated by the communication in the procedure in which the first electronic apparatus communicates with the second electronic apparatus. The acquiring unit 202 acquires the association information associated with the processing object. The executing unit 203 executes the operation based on the association information.

In particular, in one embodiment, the acquiring unit 202 includes a transmitting unit and a receiving unit (not shown). The transmitting unit transmits the processing object to the remote server. The receiving unit receives the association information from the remote server. The association information is information associated with the processing object and obtained by analyzing the processing object by the remote server.

In another embodiment, the acquiring unit 202 includes an analyzing unit (not shown) for analyzing the processing object to determine the association information.

Further, in one embodiment, the information processing apparatus 200 determines the processing object by detecting the input operation taken by the user actively.

In particular, the communication information includes the information of the video picture, and the determining unit 201 includes a detecting unit and a first processing object determining unit (not shown). The detecting unit detects the input operation of the user. In addition, the first processing object determining unit determines the processing object from the video picture based on the input operation.

More particularly, in the first example, the detecting unit is configured to detect the input operation for selecting a region in the video picture. Moreover, the first processing object determining unit is configured to determine a partial video picture corresponding to the region in the video picture as the processing object.

In the second example, the detecting unit is configured to detect the click operation for clicking the video picture, and the first processing object determining unit includes an image dividing unit for executing image partition for the video picture based on a specific position in the video picture corresponding to the click operation to obtain a partial video picture including the specific position; and an object determining unit for determining the partial video picture as the processing object.

In the third example, the information processing apparatus 200 further includes a recognizing unit (not shown) for executing the image recognition to the video picture to determine the plurality of candidate objects. Further, the detecting unit includes a selection detecting unit for detecting the selection operation of at least one candidate object in the plurality of candidate objects by the user. Moreover, the first processing object determining unit is configured to determine the selected at least one candidate object as the processing object based on the selection operation.

In another embodiment, the information processing apparatus 200 determines the processing object by analyzing the communication information automatically.

More particularly, in the first example, the communication information includes the information of the static picture. The determining unit 201 further includes a static picture recognizing unit, a target region determining unit and a second processing object determining unit (not shown). The static picture recognizing unit executes the image recognition to the static picture to divide the static picture into a plurality of regions. The target region determining unit determines the target region from the plurality of regions based on the predetermined criteria. The second processing object determining unit determines the processing object based on the target region.

In the second example, the communication information includes the information of the dynamic picture. The determining unit 201 further includes a dynamic picture recognizing unit and a third processing object determining unit (not shown). The dynamic picture recognizing unit recognizes the dynamic picture to recognize the specific action performed by the user in the procedure of the communication. The third processing object determining unit determines the processing object based on the specific action.

In the third example, the communication information includes audio information. The determining unit 201 includes an audio recognizing unit for executing the audio recognition to the audio to determine the processing object.

In the fourth example, the information processing apparatus 200 determines the processing object by detecting the input operation taken by the user actively and analyzing the communication information automatically.

In particular, in this embodiment, the determining unit 201 further includes a candidate object determining unit, a selection detecting unit, and a fourth processing object determining unit. The candidate object determining unit determines the plurality of candidate objects based on the communication information. The selection detecting unit detects the selection operation of at least one candidate object in the plurality of candidate objects by the user. The fourth processing object determining unit determines the selected at least one candidate object as the processing object based on the selection operation.

In the fifth example, the communication information includes the text information. In this case, the information processing apparatus 200 can execute text recognition to the text to determine the processing object.

Specific configurations and operations of the respective units of the information processing apparatus of the first implementation mode of the present disclosure has been described in detail in the description of the information processing method of the first implementation mode of the present disclosure with reference to FIG. 1, and it is not repeated here.

Hereinbefore, the information processing apparatus according to the first implementation mode of the present disclosure is described.

With the information processing apparatus of the first implementation mode of the present disclosure, the communication information generated in the procedure of the communication can be used. Therefore, in addition to implementing the object of communication, it can further improve the application value of the communication, and enhance the user's experience greatly.

Further, in the information processing apparatus of the first implementation mode of the present disclosure, at the terminal side (i.e., the side of the first electronic apparatus and/or the second electronic apparatus), the processing object can be determined in response to the input operation of the user or automatically based on the communication information, and the above-described two manners can be combined.

Therefore, with the information processing apparatus of the first implementation mode of the present disclosure, therefore provided multiple ways to use the communication information, so as to further enhance the user's experience.

(A Second Implementation Mode)

The second implementation mode of the present disclosure provides an information processing method and an information processing apparatus. Unlike the information processing method and the information processing apparatus of the first implementation mode of the present disclosure, in the second implementation mode of the present disclosure the information processing method and the information processing apparatus are applied in the server side rather than the terminal side.

Hereinafter, the information processing method of the second implementation mode of the present disclosure is described with reference to FIG. 3. When the information processing method of the embodiments starts, the first electronic apparatus and the second electronic apparatus are in a procedure of communication.

Figure 3:
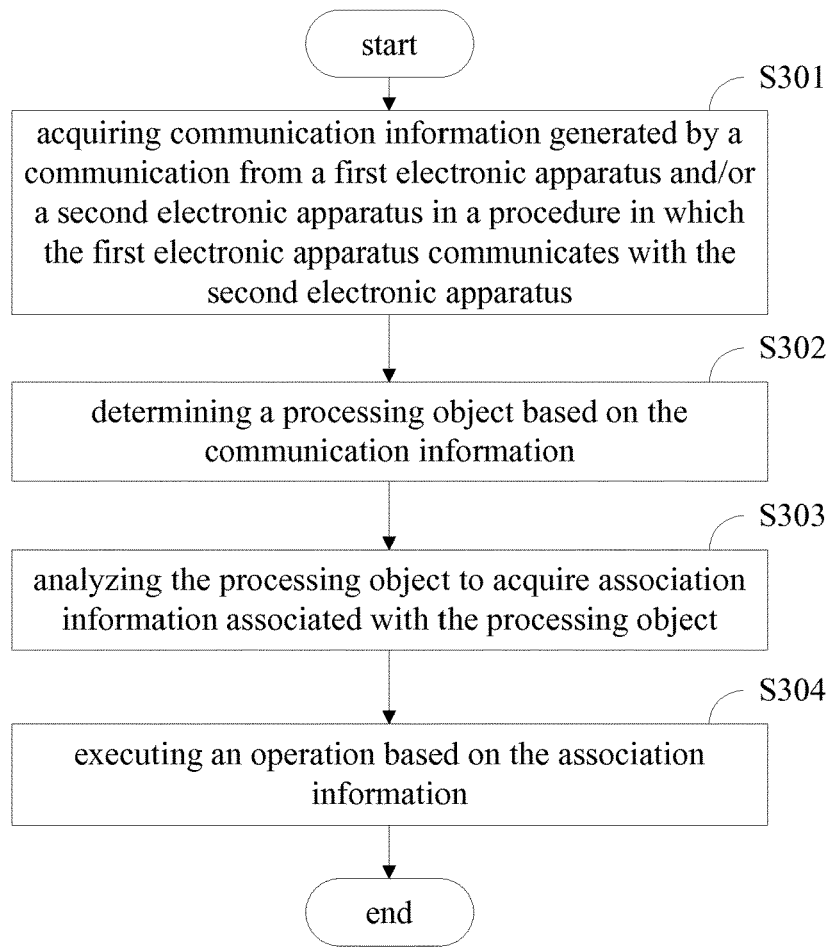
FIG. 3 is a flow chart illustrating the information processing method of a second implementation mode according to the present disclosure.

As shown in FIG. 3, first, at step S301, the information processing method acquires communication information generated by a communication from the first electronic apparatus and/or the second electronic apparatus.

The communication information is generated in the procedure in which the first electronic apparatus communicates with the second electronic apparatus, and is transmitted to the server by at least one of the first electronic apparatus and the second electronic apparatus. The communication information may be audio information, video information, text information, or the like, or may be any combination of the above-described information.

Then, at step S302, the information processing method determines the processing object based on the communication information.

As in the above-described first implementation mode, the determination of the processing object may be implemented by detecting the input operation taken by the user actively, and may also be implemented by analyzing and recognizing the communication information automatically by the information processing method.

In particular, in an embodiment, the communication includes a video communication, and the communication information includes information of a video picture. In this case, the user specifies the processing object by executing an input operation to the video picture. Correspondingly, the information processing method of the embodiments determines the processing object specified by the user by obtaining information of the input operation executed to the video picture by the user.

More particularly, the information processing method receives input track information transmitted from at least one of the first electronic apparatus and the second electronic apparatus. The electronic apparatus transmitting the input track information may be the same electronic apparatus as the electronic apparatus transmitting the communication information in the above-described step S301, or may be a different electronic apparatus.

The input track information is generated by detecting the input operation of the user by at least one of the first electronic apparatus and the second electronic apparatus. The input track information may include information of a series of tracks formed by a plurality of tracing points, and may also include information of a track formed by a single tracing point. For example, in case that the electronic apparatus includes a touch control unit and the user executes the input operation through the touch control unit, the input track information may be information generated by detecting a sliding gesture of the user, and may also be information generated by detecting a click operation of the user.

Further, the electronic apparatus transmitting the input track information in the first electronic apparatus and the second electronic apparatus may further transmit information such as the size of a displayed picture of the electronic apparatus or the like.

Then the information processing method determines the processing object based on the input track information.

More particularly, for example, in the first example, the user of the first electronic apparatus can select a region in the video picture. Correspondingly, the first electronic apparatus forms the input track information by detecting the input operation for selecting a region in the video picture. Hereafter, the first electronic apparatus transmits the input track information and parameter information of electronic apparatus of the first electronic apparatus to the server. Then the information processing method determines a part of the video picture corresponding to the region in the video picture as the processing object.

In the second example, for example, the user of the first electronic apparatus may click a specific position in the video picture. Correspondingly, the first electronic apparatus forms the input track information by detecting the clicking operation for clicking the video picture. Hereafter, the first electronic apparatus transmits the input track information to the server.

Next, the information processing method determines which position in the video picture (i.e., the above specific position) that the input track information corresponds to based on the input track information. Then the information processing method executes the image partition to the video picture to obtain a partial video picture including the specific position and determine the partial video picture as the processing object. Similarly, the information processing method may execute the above-described operations based on various kinds of algorithms of image partition known conventionally, which are not described in detail here.

In the third example, the information processing method may determine the processing object by combining an active input of the user and an automatic analysis by the server.

In particular, the information processing method may execute the image recognition to the video picture to determine the plurality of candidate objects. Hereafter, the information processing method may transmit the plurality of candidate objects to at least one of the first electronic apparatus and the second electronic apparatus to be selected by the user. The at least one of the first electronic apparatus and the second electronic apparatus detects a selection operation of the at least one candidate object of the plurality of candidate objects to generate corresponding input track information and transmit to the server.

Therefore, the server determines the selected at least one candidate object as the processing object based on the selection information (i.e., the above-described input track information) obtained by detecting the selection operation.

Hereinafter, the case of determining the processing object by analyzing and recognizing the communication information automatically is described.

In particular, in the first example, the communication information includes the information of the static picture. In this case, the information processing method executes the image recognition to the static picture to divide the static picture into a plurality of regions. As in the above-described first implementation mode, those skilled in the art can adopt various kinds of algorithms to execute the image partition, which are not described in detail here.

Then the information processing method determines a target region from the plurality of regions based on predetermined criteria. As in the above-described first implementation mode, those skilled in the art can adopt various kinds of criteria and corresponding algorithms to determine the target region, which are not described in detail here.

After determining the target region, the information processing method determines the processing object based on the target region. In particular, for example, the information processing method may analyze the video picture of the target region to determine the processing object. For example, the information processing method may determine the processing object by recognizing the video picture of the target region to determine the kinds of object thereof. Also, for example, the information processing method may determine the processing object by executing blur match between the video picture of the target region and the images stored in an information bank in advance. Of course, the above-described method of determining the processing object based on the target region is only an example. The information processing method of the embodiments can adopt various other kinds of methods known by those skilled in the art to determine the processing object, which are not described in detail here.

In the second example, the communication information includes the information of the dynamic picture. In this case, the information processing method may recognize the dynamic picture to recognize a specific action performed by the user in the procedure of the communication. For example, the information processing method can execute a recognition similar to the above to the dynamic picture constituent of a plurality of frames, which are continuous in time, so as to recognize an action performed by the user in this time period.

Then the information processing method can determine the processing object based on the specific action. For example, the information processing method can determine the processing object according to the specific action based on a table of association relationship between the pre-stored action and the processing object.

In the third example, the communication information includes audio information. In this case, the information processing method can execute audio recognition to the audio to determine the processing object.

More particularly, for example, the information processing method can decide whether there is an audio segment matched with a predetermined keyword in the audio. At the time of deciding that there is the audio segment matched with the predetermined keyword in the audio, the information processing method determines the audio segment as the processing object.

Also, for example, the information processing method executes the semantic analysis to the audio and determines the processing object based on the result of the semantic analysis.

Of course, the information processing method can adopt various kinds of algorithms known conventionally to execute the audio recognition to the audio, which are not described in detail here.

Further, as with the above-mentioned, the information processing method of the embodiments may combine an active input of the user and an automatic recognition of the electronic apparatus. In particular, in the fourth example, the information processing method determines the plurality of candidate objects based on the communication information, and transmits the plurality of candidate objects to at least one of the first electronic apparatus and the second electronic apparatus. The electronic apparatus that has received the candidate object detects the selection operation for selecting at least one candidate object by the user, and transmits the selection information generated by the selection operation to the server. The information processing method receives the selection information, and determines the selected at least one candidate object as the processing object based on the selection information.

In the fifth example, the communication information includes the text information. In this case, the information processing method can execute text recognition to the text to determine the processing object.

More particularly, for example, the information processing method can decide whether there is a text segment matched with a predetermined keyword in the text. At the time of deciding that there is the text segment matched with the predetermined keyword in the text, the information processing method determines the text segment as the processing object.

Also, for example, the information processing method executes the semantic analysis to the text and determines the processing object based on the result of the semantic analysis.

Of course, the information processing method can adopt various kinds of algorithms known conventionally to execute the text recognition to the text, which are not described in detail here.

With the above-described processing, at step S302, the information processing method determines the processing object based on the received communication information.

Next, at step S303, the information processing method analyzes the processing object to acquire the association information associated with the processing object.

In particular, in one embodiment, the object information of a plurality of objects is pre-stored in the remote server, and the object information of each object is stored associated with attribute information. The attribute information is for representing the attribute of the object.

Therefore, for example, the information processing method analyzes the processing object based on an association relationship between the object information and the attribute information to determine the attribute of the processing object. Then, the information processing method determines corresponding attribute information in the stored attribute information based on the attribute of the processing object. For example, the attribute information may be classified as different categories. The information processing method may determine the attribute information, which belongs to the same category or a corresponding category as the attribute of the processing object in the stored attribute information as the corresponding attribute information. Then the information processing method determines the object information associated with the corresponding attribute information as the association information.

In another embodiment, the attribute information includes various kinds of information. The information processing method may determine other attribute information of the processing object as the association information directly after determining a certain attribute of the processing object.

It must be noted that the above-described manners of determining the association information by the information processing method are only examples. Those skilled in the art may adopt various other kinds of manners to acquire the association information.

Then, at step S304, the information processing method executes the operation based on the association information. In particular, for example, the information processing method may store the association information and may transmit the association information to at least one of the first electronic apparatus and the second electronic apparatus. Of course, the information processing method may also use the association information in various other manners, which are all in the range of the present disclosure.

Hereinbefore, the information processing method according to the second implementation mode of the present disclosure is described.

In the information processing method according to the second implementation mode of the present disclosure, the processing object is determined based on the communication information generated by the communication and the association information associated with the processing object is acquired, and the operation based on the association information is executed.

Thus, with the information processing method of the second implementation mode of the present disclosure, the communication information generated in the procedure of the communication can be used. Therefore, in addition to implementing the object of communication, it can further improve the application value of the communication, and enhance the user's experience greatly.

Further, in the information processing method of the second implementation mode of the present disclosure, at the server side, the processing object can be determined in response to the input operation of the user or may be determined automatically based on the communication information, and the above-described two manners may also be combined.

Therefore, with the information processing method of the second implementation mode of the present disclosure, there are provided multiple ways to use the communication information, so as to further enhance the user's experience. Further, in case that processing capacity at the electronic apparatus side is limited, the information processing method of the second implementation mode of the present disclosure is able to reduce the processing burden at the electronic apparatus side, which is particularly advantageous.

Hereinafter, the information processing apparatus applied in the server of the second implementation mode of the present disclosure is described with reference to FIG. 4.

Figure 4:
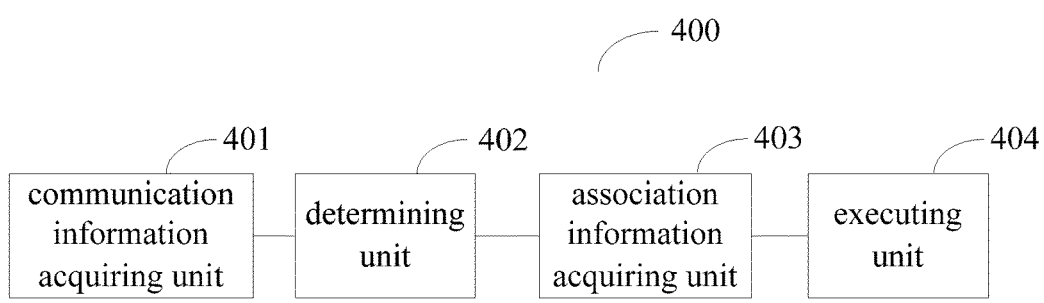
FIG. 4 is a block diagram illustrating the main configuration of the information processing apparatus of the second implementation mode according to the present disclosure.

As shown in FIG. 4, an information processing apparatus 400 of the embodiments includes communication information acquiring unit 401, a determining unit 402, an association information acquiring unit 403, and an executing unit 404.

The communication information acquiring unit 401 acquires the communication information generated by the communication from the first electronic apparatus and/or the second electronic apparatus in the procedure in which the first electronic apparatus communicates with the second electronic apparatus. The determining unit 402 determines the processing object based on the communication information. The association information acquiring unit 403 analyzes the processing object to acquire the association information associated with the processing object. The executing unit 404 executes the operation based on the association information.

In particular, in one embodiment, the communication information is the information of the static picture. The determining unit 402 includes a receiving unit and a first processing object determining unit (not shown). The receiving unit receives the parameter information of electronic apparatus and the input track information transmitted from at least one of the first electronic apparatus and the second electronic apparatus. The input track information is generated by detecting the input operation of the user by at least one of the first electronic apparatus and the second electronic apparatus. The first processing object determining unit determines the processing object based on the parameter information of electronic apparatus and the input track information.

More particularly, in the first example, the input track information is obtained by detecting the input operation for selecting a region in the video picture by at least one of the first electronic apparatus and the second electronic apparatus. The first processing object determining unit is configured to determine a partial video picture corresponding to the region in the video picture as the processing object based on the parameter information of electronic apparatus.

In the second example, the input track information is obtained by detecting the clicking operation for clicking the video picture by at least one of the first electronic apparatus and the second electronic apparatus. The first processing object determining unit includes an image dividing unit and an object determining unit. The image dividing unit executes the image partition to the video picture based on the parameter information of electronic apparatus and based on the specific position in the video picture corresponding to the click operation, to obtain the partial video picture including the specific position. In addition, the object determining unit determines the partial video picture as the processing object.

In the third example, the information processing apparatus 400 further includes a recognizing unit and a transmitting unit (not shown). The recognizing unit executes the image recognition to the video picture to determine the plurality of candidate objects. The transmitting unit transmits the plurality of candidate objects to at least one of the first electronic apparatus and the second electronic apparatus. The input track information is obtained by detecting the selection operation of the at least one candidate object in the plurality of candidate objects of the user by the at least one of the first electronic apparatus and the second electronic apparatus. Further, the first processing object determining unit is configured to determine the selected at least one candidate object as the processing object based on the parameter information of electronic apparatus and based on the selection operation.

In another embodiment, the communication information is the information of the static picture. The determining unit 402 further includes a static picture recognizing unit, a target region determining unit and a second processing object determining unit. The static picture recognizing unit executes the image recognition to the static picture to divide the static picture into a plurality of regions. The target region determining unit determines the target region from the plurality of regions based on the predetermined criteria. The second processing object determining unit determines the processing object based on the target region.

In another embodiment, the communication information is the information of the dynamic picture. The determining unit 402 further includes a dynamic picture recognizing unit and a third processing object determining unit. The dynamic picture recognizing unit recognizes the dynamic picture to recognize the specific action made by the object in the dynamic picture in the procedure of the communication. The third processing object determining unit determines the processing object based on the specific action.

In yet another embodiment, the communication information is the information of the audio. The determining unit 402 includes an audio recognizing unit for executing the audio recognition to the audio to determine the processing object.

Further, in yet another embodiment, the determining unit 402 includes a candidate object determining unit, a transmitting unit, a receiving unit, and a fourth processing object determining unit (not shown).

In particular, the candidate object determining unit determines the plurality of candidate objects based on the communication information. The transmitting unit transmits the plurality of candidate objects to at least one of the first electronic apparatus and the second electronic apparatus. The receiving unit receives the selection information for selecting at least one candidate object by the user of the at least one of the first electronic apparatus and the second electronic apparatus. The fourth processing object determining unit determines the selected at least one candidate object as the processing object based on the selection information.

Further, in one embodiment, the object information of the plurality of objects is pre-stored in the server. The object information of each object and the attribute information for representing the attribute of the object are stored in association with each other. In this embodiment, the association information acquiring unit 403 includes an attribute determining unit, an attribute information determining unit and an object information determining unit (not shown).

In particular, the attribute determining unit analyzes the processing object to determine the attribute of the processing object. The attribute information determining unit determines corresponding attribute information in the stored attribute information based on the attribute of the processing object. The object information determining unit determines the object information associated with the corresponding attribute information as the association information.

Specific configurations and operations of the respective units of the information processing apparatus of the second implementation mode of the present disclosure have been described in detail in the description of the information processing method of the second implementation mode of the present disclosure with reference to FIG. 3, and it is not repeated here.

Hereinbefore, the information processing apparatus according to the second implementation mode of the present disclosure is described.

With the information processing apparatus of the second implementation mode of the present disclosure, the communication information generated in the procedure of the communication can be used. Therefore, in addition to implementing the object of communication, it can further improve the application value of the communication, and enhance the user's experience greatly.

Further, in the information processing apparatus of the second implementation mode of the present disclosure, at the server side, the processing object can be determined in response to the input operation of the user or may be determined automatically based on the communication information, and the above-described two manners may also be combined.

Therefore, with the information processing apparatus of the second implementation mode of the present disclosure, there are provided multiple ways to use the communication information to further enhance the user's experience. Further, in case that processing capacity at the electronic apparatus side is limited, the information processing apparatus of the second implementation mode of the present disclosure is able to reduce the processing burden at the electronic apparatus side, which is particularly advantageous.

(A Third Implementation Mode)

The third implementation mode of the present disclosure provides the information processing method and the information processing apparatus applied in the terminal side. The information processing method and the information processing apparatus may execute various kinds of operations such as outputting immediately, storing and forwarding or the like after acquiring the above-described association information.

First, the information processing method of the third implementation mode of the present disclosure is described. Similarly, in the following description, it assumes that the information processing method is applied in the first electronic apparatus.

A flow of the information processing method of the third implementation mode of the present disclosure is similar to a flow of the information processing method of the first implementation mode of the present disclosure. That is, the information processing method includes similarly determining the processing object based on communication information generated based on the communication in a procedure in which the first electronic apparatus executes a multimedia communication with the second electronic apparatus; acquiring the association information associated with the processing object; and executing the operation based on the association information.

Further, similarly, in the information processing method of the third implementation of the present disclosure, the information processing method may transmit the processing object to the remote server, analyze the processing object by the remote server to obtain the association information, and transmit the association information to the first electronic apparatus. On the other hand, the information processing method may also analyze the processing object locally to determine the association information.

Hereinafter, detail of the operation executed by the information processing method based on the association information is described.

In a first embodiment, the information processing method outputs the association information in the procedure of the communication or outputs the association information immediately after the end of the communication.

In this case, for example, in the first example, the information processing method may generate the prompt icon for prompting the user to view and display the prompt icon. The prompt icon is for linking to the association information. Then, when it detects that the user clicks the prompt icon, the information processing method accesses the association information.

In the second example, the communication is an audio communication. In this case, the information processing method detects whether the first electronic apparatus is connected to a display device. It needs to be noted that the display device may be an external display device, and may also be a displaying unit included in the first electronic apparatus and being in a disabled status. For example, the information processing method may obtain information on the above-described connection by detecting corresponding connecting pins of the first electronic apparatus.

The information processing method outputs the association information to the display device when it detects that the first electronic apparatus is connected to a display device. Therefore, display based on the association information is executed by the display device.

In the third example, the communication is a video communication. In this case, the information processing method combines an image based on the association information and an image of the video communication to generate a combined image and display the combined image. The image based on the association information may be an image displaying various forms of content such as picture, text or the like.

In the second embodiment, the information processing method does not output the association information in the procedure of the communication or immediately after the end of the communication. Alternatively, the information processing method stores the association information in, for example, a local storage. The information processing method outputs the association information only when it decides that the predetermined condition is satisfied.

In particular, in the first example, the information processing method decides whether the current time satisfies a first predetermined condition. For example, the information processing method decides whether the current time is the time preset by the electronic apparatus or the user. Also, for example, the information processing method decides whether a time interval between the current time and time of the end of the communication is the time interval preset by the electronic apparatus or the user. Also, for example, the information processing method decides whether the time interval between the current time and the time of the end of the communication is larger than the time interval preset by the electronic apparatus or the user. The information processing method executes the display based on the association information when it decides that the current time satisfies the first predetermined condition. Of course, the above first predetermined condition is only an example. Those skilled in the art can design various other kinds of conditions as the first predetermined condition as necessary.

In the second example, the information processing method decides whether a network access satisfies a second predetermined condition when the first electronic apparatus executes the network access; for example, the information processing method decides whether a destination of the network access is a destination preset by the electronic apparatus or the user. Also, for example, the information processing method pre-stores locally a reference table between the association information and the destination of the network access. The information processing method decides whether the destination of the network access is a destination corresponding to the association information. Then, the information processing method executes the display based on the association information when it decides that the network access satisfies the second predetermined condition. Of course, the above second predetermined condition is only an example. Those skilled in the art can design various other kinds of conditions as the second predetermined condition as necessary.

In the third example, the information processing method may also detect environmental information of the first electronic apparatus. The environmental information includes, for example, position information where the first electronic apparatus is, weather information and temperature information or the like of an environment where the first electronic apparatus is. Then the information processing method decides whether the environmental information satisfies a third predetermined condition; in case of the position information, for example, the information processing method decides whether the first electronic apparatus reaches a position preset by the electronic apparatus or the user. Also, for example, the information processing method pre-stores locally a reference table between the association information and the position information. The information processing method decides whether the first electronic apparatus is at a position corresponding to the association information based on the position information. Decisions on other kinds of environmental information are similar thereto, and are not described in detail here. The information processing method executes the display based on the association information when the environmental information satisfies the third predetermined condition. Of course, the above third predetermined condition is only an example. Those skilled in the art can design various other kinds of conditions as the third predetermined condition as necessary.

Similarly, in the third embodiment, the information processing method does not output the association information in the procedure of the communication or immediately after end of the communication. Being different from the second embodiment, the information processing method transmits the association information to at least one of the remote server and the second electronic apparatus. The remote server and/or the second electronic apparatus may store the association information or output the association information, for example.

Further, in the above-described respective examples, the display processing may display the association information itself, and may also display the prompt icon for linking to the association information.

Hereinbefore, the information processing method according to the third implementation mode of the present disclosure is described.

In the information processing method according to the third implementation mode of the present disclosure, the processing object is determined based on the communication information generated by the communication and the association information associated with the processing object is acquired, and the operation based on the association information is executed.

Thus, with the information processing method of the third implementation mode of the present disclosure, the communication information generated in the procedure of the communication can be used. Therefore, in addition to implementing the object of communication, it can further improve the application value of the communication, and enhance the user's experience greatly.

Further, in the information processing method of the third implementation mode of the present disclosure, at the electronic apparatus side, the association information and/or the prompt icon may be displayed in the procedure of the communication or immediately after the end of the communication, or the association information may be stored and output of the association information triggered when it decides that the predetermined condition is satisfied at a later time, or the association information may also be output to the server and/or the second electronic apparatus to be processed.

Therefore, with the information processing method of the third implementation mode of the present disclosure, there are provided multiple ways to output the association information, which facilitate the user carrying out different customization according to circumstances, so as to further enhance the user's experience.

Hereinafter, the information processing apparatus of the third implementation mode of the present disclosure is described. Configuration of information processing apparatus is similar to the configuration of the information processing apparatus of the first implementation mode of the present disclosure in that it includes a determining unit, an acquiring unit, and an executing unit.

The determining unit determines the processing object based on communication information generated based on the communication in a procedure in which the first electronic apparatus executes the multimedia communication with the second electronic apparatus. The acquiring unit acquires the association information associated with the processing object. The executing unit executes the operation based on the association information.

As in the first implementation mode, in one embodiment, the acquiring unit may include a transmitting unit for transmitting the processing object to the remote server, and a receiving unit for receiving the association information from the remote server, the association information is information associated with the processing object and obtained by analyzing the processing object by the remote server.

In another embodiment, the acquiring unit may include an analyzing unit for analyzing the processing object to determine the association information.

Further, in this implementation mode, the executing unit is configured to execute at least one of the following: displaying the association information; storing the association information; and transmitting the association information to at least one of the remote server and the second electronic apparatus.

In particular, in one embodiment, the executing unit may include an icon generating unit and an icon displaying unit. The icon generating unit generates the prompt icon for prompting the user to view, and the prompt icon is for linking to the association information. The icon displaying unit displays the prompt icon.

Further, in another embodiment, the communication is the audio communication. The executing unit may include a first detecting unit and an output unit. The first detecting unit detects whether the first electronic apparatus is connected to a display device. The output unit outputs the association information to the display device when it detects that the first electronic apparatus is connected to a display device, and the display device displays based on the association information.

In another embodiment, the communication is the video communication. The executing unit may include a combining unit and a combined image displaying unit. The combining unit combines the image based on the association information and the image of the video communication to generate the combined image. The combined image displaying unit displays the combined image.

In case that the executing unit is configured to store the association information, the information processing apparatus further includes a first deciding unit for deciding whether the current time satisfies the first predetermined condition after storing the association information; and the executing unit is configured to execute the display based on the association information when it decides that the current time satisfies the first predetermined condition.

In another embodiment, in case that the executing unit is configured to store the association information, the information processing apparatus further includes a second deciding unit for deciding whether the network access satisfies the second predetermined condition when the first electronic apparatus executes the network access after storing the association information; and the executing unit is configured to execute the display based on the association information when it decides that the network access satisfies the second predetermined condition.

In another embodiment, in case that the executing unit is configured to store the association information, the information processing apparatus further includes an environmental information detecting unit for detecting the environmental information of the first electronic apparatus after storing the association information; and a third deciding unit for deciding whether the environmental information satisfies the third predetermined condition; and the executing unit is configured to execute the display based on the association information when it decides that the environmental information satisfies the third predetermined condition.

Further, in the third implementation mode of the present disclosure, the executing unit may be configured to display at least one of the association information and the prompt icon, and the prompt icon is for linking to the association information.

Specific configurations and operations of the respective units of the information processing apparatus of the third implementation mode of the present disclosure have been described in detail in the description of the information processing method of the third implementation mode of the present disclosure, and it is not repeated here.

Hereinbefore, the information processing apparatus according to the third implementation mode of the present disclosure is described.

With the information processing apparatus of the third implementation mode of the present disclosure, the communication information generated in the procedure of the communication can be used. Therefore, in addition to implementing the object of communication, it can further improve the application value of the communication, and enhance the user's experience greatly.

Further, in the information processing apparatus of the third implementation mode of the present disclosure, at the electronic apparatus side, the association information and/or the prompt icon may be displayed in the procedure of the communication or immediately after the end of the communication, or the association information may be stored and output of the association information triggered when it decides that the predetermined condition is satisfied at a later time, or the association information may also be output to the server and/or the second electronic apparatus to be processed.

Therefore, with the information processing apparatus of the third implementation mode of the present disclosure, there are provided multiple ways to output the association information, which facilitate the user carrying out different customization according to circumstances, so as to further enhance the user's experience.

(A Fourth Implementation Mode)

The fourth implementation mode of the present disclosure provides an information processing method and an information processing apparatus applied in the server. The information processing method and the information processing apparatus may execute various kinds of operations such as outputting immediately, storing and forwarding or the like after acquiring the above-described association information.

First, the information processing method of the fourth implementation mode of the present disclosure is described.

A flow of the information processing method of the fourth implementation mode of the present disclosure is similar to a flow of the information processing method of the second implementation mode of the present disclosure. That is, the information processing method includes similarly acquiring the communication information generated by the communication from the first electronic apparatus and/or the second electronic apparatus in the procedure in which the first electronic apparatus communicates with the second electronic apparatus; determining the processing object based on the communication information; analyzing the processing object to acquire association information associated with the processing object; and executing the operation based on the association information.

Further, as in the second implementation mode, the object information of a plurality of objects may also be pre-stored in the server, and the object information of each object is stored associated with the attribute information for representing the attribute of the object. The information processing method may analyze the processing object to determine the attribute of the processing object, determine the corresponding attribute information in the stored attribute information based on the attribute of the processing object, and determine the object information associated with the corresponding attribute information as the association information.

Hereinafter, detail of the operation executed by the information processing method based on the association information is described.

In particular, in the information processing method of the fourth implementation mode of the present disclosure, after the association information is acquired as explained above, the association information may be stored for outputting later, for example.

In another embodiment, the information processing method may also transmit the association information to at least one of the first electronic apparatus and the second electronic apparatus based on the predetermined strategy.

More particularly, in the first example, the information processing method receives the request from at least one of the first electronic apparatus and the second electronic apparatus. The request is for the server to transmit the association information. In this example, it assumes that the information processing method has received the request from the first electronic apparatus. Therefore, the information processing method transmits the association information to the electronic apparatus, which makes the request in the first electronic apparatus and the second electronic apparatus, that is, the first electronic apparatus in this example in response to the request.

In the second example, the information processing method does not need to respond to an extra request from the first electronic apparatus or the second electronic apparatus and can transmit the association information directly. In this case, the information processing method transmits the association information to the electronic apparatus, which transmits the communication information in the first electronic apparatus and the second electronic apparatus by default.

In the third example, the communication information includes audio information. The information processing method executes semantic analysis to the audio to determine which one of the first electronic apparatus and the second electronic apparatus the association information is appropriate for. The technique of executing the semantic analysis by the information processing method is known to those skilled in the art, and is not described in detail here. After obtaining a determination result through the semantic analysis, the information processing method transmits the association information to the electronic apparatus determined as appropriate in the first electronic apparatus and the second electronic apparatus.

In the fourth example, the communication information includes the textual information. Similarly, the information processing method executes the semantic analysis to the text to determine which one of the first electronic apparatus and the second electronic apparatus the association information is appropriate for. The technique of executing the semantic analysis by the information processing method is known to those skilled in the art, and is not described in detail here. Similarly, after obtaining a determination result through the semantic analysis, the information processing method transmits the association information to the electronic apparatus determined as appropriate in the first electronic apparatus and the second electronic apparatus.

It needs to be noted that the above-described various kinds of strategies are only examples. Those skilled in the art can design various other kinds of strategies to transmit the association information to an appropriate electronic apparatus as necessary.

Hereinbefore, the information processing method according to the fourth implementation mode of the present disclosure is described.

In the information processing method according to the fourth implementation mode of the present disclosure, the processing object is determined based on the communication information generated by the communication and the association information associated with the processing object is acquired, and the operation based on the association information is executed.

Thus, with the information processing method of the fourth implementation mode of the present disclosure, the communication information generated in the procedure of the communication can be used. Therefore, in addition to implementing the object of communication, it can further improve the application value of the communication, and enhance the user's experience greatly.

Further, in the information processing method of the fourth implementation mode of the present disclosure, at the server side, the association information may be stored and output later, or the association information may be transmitted to the appropriate electronic apparatus according to various different strategies to be further processed by the electronic apparatus, which receives the association information.

Therefore, with the information processing method of the fourth implementation mode of the present disclosure, there are provided multiple ways to output the association information, and there are provided multiple ways to output the association information to different electronic apparatus, which facilitate the service provider executing different customization according to circumstances to further enhance the user's experience.

Hereinafter, the information processing apparatus of the fourth implementation mode of the present disclosure is described.

Configuration of information processing apparatus is similar to the configuration of the information processing apparatus of the second implementation mode of the present disclosure, in that it includes an acquiring unit, a determining unit, an analyzing unit and an executing unit.

The acquiring unit acquires the communication information generated by the communication from the first electronic apparatus and/or the second electronic apparatus in the procedure in which the first electronic apparatus communicates with the second electronic apparatus. The determining unit determines the processing object based on the communication information. The analyzing unit analyzes the processing object to acquire the association information associated with the processing object. The executing unit executes the operation based on the association information.

As in the second implementation mode, the object information of a plurality of objects may also be pre-stored in the server, and the object information of each object is stored associated with the attribute information for representing the attribute of the object. The acquiring unit includes an attribute determining unit, an attribute information determining unit and an object information determining unit.

The attribute determining unit analyzes the processing object to determine the attribute of the processing object. The attribute information determining unit determines corresponding attribute information in the stored attribute information based on the attribute of the processing object. The object information determining unit determines the object information associated with the corresponding attribute information as the association information.

In the information processing apparatus of the fourth implementation mode, the executing unit is configured to execute at least one of the following: storing the association information; and transmitting the association information to at least one of the first electronic apparatus and the second electronic apparatus based on the predetermined strategy.

In case that the association information is transmitted to the first electronic apparatus or the second electronic apparatus based on the predetermined strategy, in the first example the executing unit includes a receiving unit for receiving a request from at least one of the first electronic apparatus and the second electronic apparatus; and a transmitting unit for transmitting the association information to the electronic apparatus which makes the request in the first electronic apparatus and the second electronic apparatus in response to the request.

In the second example, the executing unit is configured to transmit the association information to the electronic apparatus, which transmits the communication information in the first electronic apparatus and the second electronic apparatus.

In the third example, the communication information includes the audio information. The executing unit includes a semantic analyzing unit for executing the semantic analysis to the audio to determine which one of the first electronic apparatus and the second electronic apparatus the association information is appropriate for; and a transmitting unit for transmitting the association information to the electronic apparatus which is determined as appropriate in the first electronic apparatus and the second electronic apparatus.

In the fourth example, the communication information includes the textual information. The executing unit includes a semantic analyzing unit for executing the semantic analysis to the text to determine which one of the first electronic apparatus and the second electronic apparatus the association information is appropriate for; and a transmitting unit for transmitting the association information to the electronic apparatus which is determined as appropriate in the first electronic apparatus and the second electronic apparatus.

Specific configurations and operations of the respective units of the information processing apparatus of the fourth implementation mode of the present disclosure have been described in detail in the description of the information processing method of the fourth implementation mode of the present disclosure, and it is no longer repeated here.

Hereinbefore, the information processing apparatus according to the fourth implementation mode of the present disclosure is described.

With the information processing apparatus of the fourth implementation mode of the present disclosure, the communication information generated in the procedure of the communication can be used. Therefore, in addition to implementing the object of communication, it can further improve the application value of the communication, and enhance the user's experience greatly.

Further, in information processing apparatus of the fourth implementation mode of the present disclosure, at the server side, the association information may be stored and output later, or the association information may be transmitted to the appropriate electronic apparatus according to various different strategies to be further processed by the electronic apparatus, which receives the association information.

Therefore, with the information processing apparatus of the fourth implementation mode of the present disclosure, there are provided multiple ways to output the association information, and there are provided multiple ways to output the association information to different electronic apparatus, which facilitate the service provider executing different customization according to circumstances to further enhance the user's experience.

Hereinbefore, the information processing method and the information processing apparatus according to the first implementation mode to the fourth implementation mode of the present disclosure are described.

Hereinafter, applications of the information processing method and the information processing apparatus of the embodiments are described in combination with several specific scenarios.

Figure 5A:
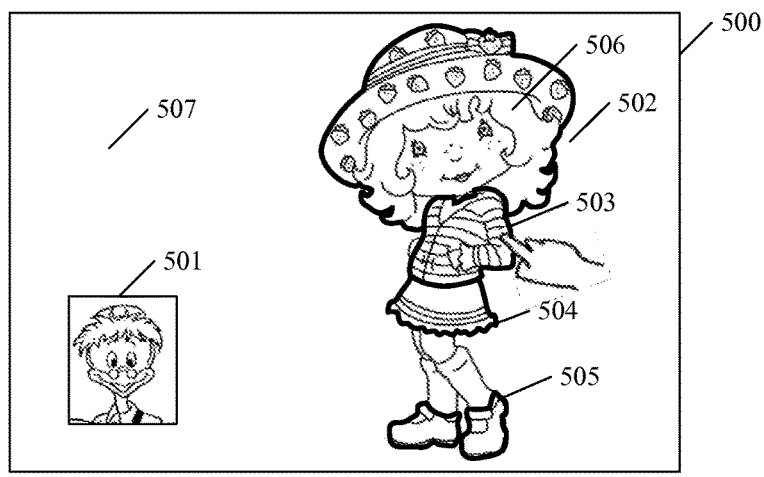
FIGS. 5A-5C are schematic diagrams illustrating displays of the first electronic apparatus to which the information processing method of the embodiments is applied.
Figure 5B:
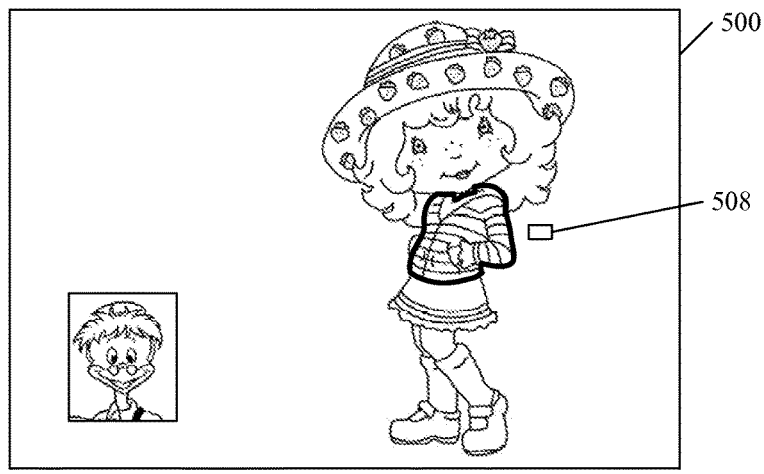
Figure 5C:
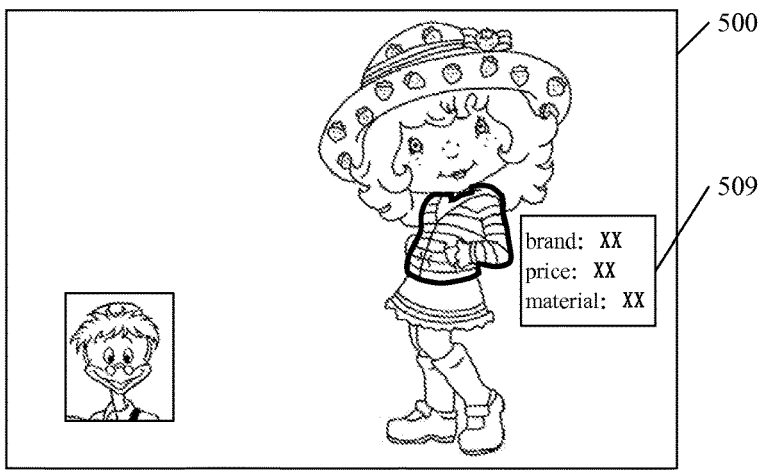

First, the information processing method and the information processing apparatus of the embodiments are described with reference to FIGS. 5A-5C. In the scenarios as shown in FIGS. 5A-5C, the first electronic apparatus is executing the video communication with the remote second electronic apparatus. FIGS. 5A-5C are schematic diagrams illustrating display on a display screen 500 of the first electronic apparatus to which the information processing method of the embodiments is applied.

The display screen 500 is divided into two regions of a first region 501 and a second region 502. An image of the user of the first electronic apparatus (hereinafter referred to as a first user as appropriate) picked up by the first electronic apparatus through an image pick-up unit, for example a pre-positioned camera head, is displayed in the first region 501. An image of the user of the second electronic apparatus (hereinafter referred to as a second user as appropriate) picked up by the second electronic apparatus through an image pick-up unit, for example a pre-positioned camera head, is displayed in the second region 502.

In the following description, it is assumed that the display screen 500 of the first electronic apparatus is a touch display screen. However, those skilled in the art can understand that the information processing method and the information processing apparatus of the embodiments may also be applied in electronic apparatus without touch control input similarly.

In the scenario of FIG. 5A, the first user is in video communication with the second user, and gets interested in the coat of the second user, and specifies a region 503 corresponding to the coat on the display screen 500 by a gesture. The information processing method detects the above-described operation of the user and determines a partial video picture corresponding to the region 503 in the video picture as the processing object.

Alternatively, the first user may click any position in a region where the coat is in the display screen 500 through a gesture. The information processing method obtains the partial video picture including the position by executing the image partition to the video picture, also as shown in 503.

Alternatively, the information processing method may execute the image recognition to the video picture to divide the video picture into a plurality of regions, for example the region 503 corresponding to the coat, a region 504 corresponding to trousers, a region 505 corresponding to shoes, a region 506 corresponding to a human face and a region 507 corresponding to a background. Then the information processing method determines the region 503 in the plurality of regions as the processing object based on a predetermined criterion, for example a significance of the region.

Alternatively, the information processing method also combine the above-described user's input with a manner of automatic determination. That is, the information processing method may automatically execute the image recognition to the video picture first to determine a plurality of candidate objects, for example the coat 503, the trousers 504, and the shoes 505, and present the plurality of candidate objects to the first user. Ways of presenting are not limited. For example, the information processing method may display the partial video picture corresponding to the regions 503, 504 and 505 in a form of a thumbnail at an appropriate position on the display screen 500. Also, for example, the information processing method may display a prompt mark near the regions 503, 504 and 505, and so on. Then the information processing method detects a selection operation of at least one candidate objects in the plurality of candidate objects by the user, and determines the selected at least one candidate object as the processing object based on the selection operation.

Thus, the information processing method acquires the association information associated with the processing object and executes the operation based on the association information. In particular, in this scenario, for example, the information processing method determines a brand name of the coat through image analysis, and thereby obtains the attribute information such as price, material, producing area or the like of the coat as the association information. Also, for example, the information processing method determines the brand name of coat through the image analysis, and thereby obtains information on another coat, which belongs to the same brand name as the coat or the like as the association information. Of course, the above-described manner of determining the association information by the information processing method is only an example.

After obtaining the association information, in one embodiment, the information processing method generates the prompt icon for prompting the user to view and for linking to the association information and displays the prompt icon, for example as shown by a icon 508 in FIG. 5B.

In another embodiment, the information processing method generates an image based on the association information, as shown by 509 in FIG. 5c, and combines it with the image of the video communication to generate a combined image and displays the combined image.

In another embodiment, the information processing method does not output immediately after acquiring the association information, but stores it in a local memory or transmits it to at least one of the server and the second electronic apparatus.

In case of being stored in the local memory, in one embodiment, the information processing method may display the association information or an icon for prompting to access the association information when it decides that the current time satisfies the first predetermined condition.

In another embodiment, the information processing method may display the association information or the icon for prompting to access the association information when it decides whether the network access satisfies the second predetermined condition, for example when it decides that the destination of the network access is a shopping website.

In yet another embodiment, the information processing method may detect the environmental information of the first electronic apparatus, for example position information of the first electronic apparatus. When the information processing method decides that the environmental information satisfies the third predetermined condition, for example it decides that the first electronic apparatus is positioned in a shopping center, the association information or the icon for prompting to access the association information is displayed.

It needs to be noted that FIGS. 5A-5C illustrate a case in which the first user executes the video communication with the second user of the second electronic apparatus with a pre-positioned camera head of the first electronic apparatus and the processing objects are objects in the video picture corresponding to the second user.

Figure 6:
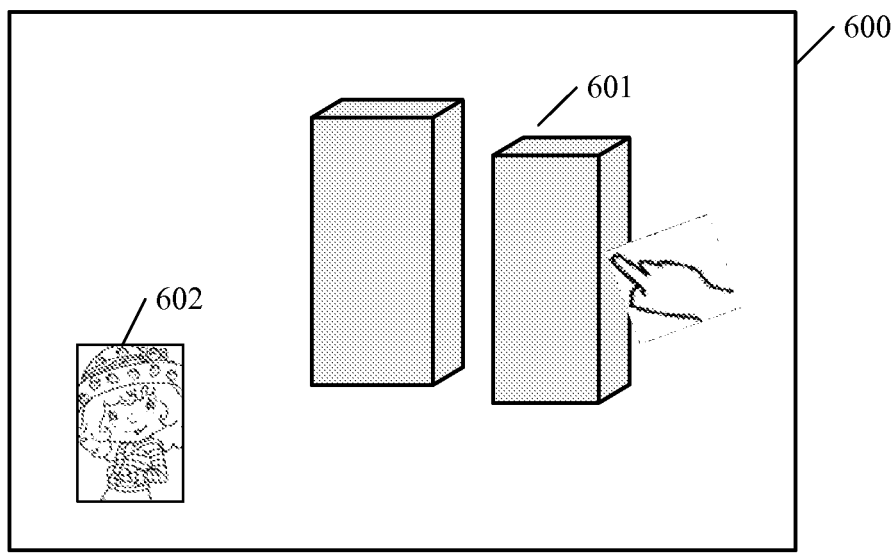
FIG. 6 is another schematic diagram illustrating display of the first electronic apparatus to which the information processing method of the embodiments is applied.

Alternatively, the information processing method and the information processing apparatus of the embodiments may also be applied in a case in which the first user executes the video communication with the second user of the second electronic apparatus with a post-positioned camera head of the first electronic apparatus and the processing objects are objects in the video picture corresponding to the first user. FIG. 6 illustrates a schematic diagram of a display in this case.

As shown in FIG. 6, the display screen 600 is divided into two regions: first region 601 and a second region 602. An image of the first electronic apparatus side picked up by the first electronic apparatus through the image pick-up unit, for example a post-positioned camera head, is displayed in the first region 601. An image of the second electronic apparatus side picked up by the second electronic apparatus through the image pick-up unit, for example a camera head, is displayed in the second region 602.

In this scenario, it is assumed that the first user wishes to describe a building near a region where the first user is to the second user, but he does not have various information such as the name of the building or the like. At this time, the first user may know some of the association information of the building such as the name, building data or the like. With the information processing method of the embodiments, the processing thereof is similar to the above-mentioned, and it is not described in detail here.

It needs to be noted that it is described by taking a case of recognizing a static image in the video communication as the example above. Those skilled in the art can understand that the information processing method and the information processing apparatus of the embodiments can be applied in the recognition of a dynamic image in a video communication, audio communication, text communication or the like similarly.

Further, it needs to be noted that it is described by taking the case in which the information processing method and the information processing apparatus are applied in the first electronic apparatus as the example above. Those skilled in the art can understand that the information processing method and the information processing apparatus of the embodiments may be applied in the second electronic apparatus and the server similarly.

Hereinbefore, application examples of the information processing method and the information processing apparatus of the embodiments are described with reference to FIG. 5 and FIG. 6.

With the information processing method and the information processing apparatus of the embodiments, the communication information generated in the procedure of the communication can be used, therefore, in addition to implementing the object of communication, it can further improve the application value of the communication, and enhance the user's experience greatly.

Further, in the information processing method and the information processing apparatus of the embodiments, at the electronic apparatus side, the processing object can be determined in response to the input operation of the user or may be determined automatically based on the communication information, and the above-described two manners may also be combined. Therefore, the information processing method and the information processing apparatus of the embodiments provide multiple ways to use the communication information, so as to further enhance the user's experience.

Further, in the information processing method and the information processing apparatus of the embodiments, the above-described procedure of determining the processing object may also be executed at the server side; thus, in case that the processing capacity at the electronic apparatus side is limited, it is able to reduce the processing burden at the electronic apparatus side, which improves the processing efficiency at the electronic apparatus side.

Further, in the information processing method and the information processing apparatus of the embodiments, at the electronic apparatus side, the association information and/or the prompt icon may be displayed in the procedure of the communication or immediately after the end of the communication, or the association information may be stored and output of the association information triggered when it decides that the predetermined condition is satisfied at a later time, or the association information may also be output to the server and/or the second electronic apparatus to be processed. Thus, it facilitates the user executing different customization according to circumstances, so as to further enhance the user's experience.

Further, in the information processing method and information processing apparatus of the embodiments, at the server side, the association information may be stored and output later, or the association information may be transmitted to the appropriate electronic apparatus according to various different strategies to be further processed by the electronic apparatus, which receives the association information. Therefore, there are provided multiple ways to output the association information to different electronic apparatus, which facilitates the service provider executing different customization according to circumstances.

Hereinbefore, the information processing method and the information processing apparatus according to the embodiment are described with reference to FIG. 1 to FIG. 6.

It needs to be explained that in the specification, the terms "include", "including" and any other variation thereof are intended to cover nonexclusive inclusion. Thus, the procedure, the method, the product or the equipment including a series of elements not only includes these elements, but also includes other elements which are not listed explicitly, or also includes inherent elements of the procedure, method, product or equipment. In case that there is no more limitation, the element defined by statement "including one" does not exclude there is additional same element in the procedure, method, article or apparatus including the element.

Further, it needs to be explained that in the specification, expressions such as "a first . . . unit", "a second . . . unit" are for convenience of reference only and should not be construed as implying two or more units separated physically. The units may be implemented as one whole unit, or may be implemented as a plurality of units as necessary.

Finally, it should be noted that the above-described series of processing does not only comprise processing executed chronologically but also processing executed parallel or individually but not chronologically.

With the description of the above implementation mode, those skilled in the art can clearly understand that the present disclosure can be implemented by means of software plus necessary hardware platform; of course, it can be implemented by hardware totally. Based on such understanding, the technical solution of the present disclosure essentially or the part contributed to the conventional description can be embodied by a form of a software product. The computer software product can be stored in a storage medium, such as a ROM/RAM, a magnetic disc, an optical disk or the like. It comprises instructions to cause a computer equipment (which may be a personal computer, a server or network equipment or the like) to execute the method according to the respective embodiments of a certain part of the embodiments.

In the embodiments, the unit/module can be implemented with software to be processed by various kinds of processors. For example, one identified executable code module may include one or more of physical or logical blocks of computer instructions, for example, which can be constructed as an object, a procedure, or a function. Nevertheless, it is not necessary for the executable codes of the identified modules to be together physically, but they may include different instructions stored in different bits, and when these instructions are combined together logically they constitute the units/modules and implement the specific purpose of the units/modules.

When the units/modules are implemented with software, in consideration of the level of the conventional hardware process, the units/modules may be implemented with software. However, when it takes no account of cost, those skilled in the art can build corresponding hardware circuits to implement corresponding functions, and the hardware circuit includes conventional very large-scale integrated (VLSI) circuit or gate array and a conventional semiconductor such as a logic chip, a transistor or the like or other discrete elements. The modules may also be implemented by a programmable hardware apparatus such as a FPGA, programmable array logic, a programmable logic utility, or the like.

The present disclosure is described in detail above. The principle and the implementation mode of the present disclosure are explained by applying specific examples in the text, and the above explanation of the embodiments is only for understanding the method of the present disclosure and the kernel idea thereof. Meanwhile, for those skilled in the art, the specific implementation mode, and range of application may be changed according to the idea of the present disclosure, thus in summary, the content in the specification should not be understood as a limitation to the present disclosure.

What is claimed is:

1. An information processing method applied in a server, the information processing method comprises:
   acquiring communication information generated by a communication from at least one of a first electronic apparatus and a second electronic apparatus in a procedure in which the first electronic apparatus communicates with the second electronic apparatus;
   determining a processing object based on the communication information;
   analyzing the processing object to acquire association information associated with the processing object; and
   executing an operation based on the association information, wherein executing the operation based on the association information includes at least one of the following:
   storing the association information;
   determining which one of the first electronic apparatus and the second electronic apparatus the association information is appropriate for based on a predetermined strategy;
   transmitting the association information to the determined one of the first electronic apparatus and the second electronic apparatus based on the predetermined strategy, wherein the transmitting comprises:
      executing semantic analysis to an audio to determine which one of the first electronic apparatus and the second electronic apparatus the association information is appropriate for when the communication information include information of the audio; and
      transmitting the association information to the electronic apparatus which is determined as appropriate in the first electronic apparatus and the second electronic apparatus.

2. The information processing method according to claim 1, wherein transmitting the association information to the first electronic apparatus or the second electronic apparatus based on the predetermined strategy includes at least one of the following:
   receiving a request from at least one of the first electronic apparatus and the second electronic apparatus;
   transmitting the association information to the electronic apparatus which makes the request in the first electronic apparatus and the second electronic apparatus in response to the request; and
   transmitting the association information to the electronic apparatus which transmits the communication information in the first electronic apparatus and the second electronic apparatus.

3. The information processing method according to claim 1, wherein determining the processing object comprises at least one of the following:
   receiving input track information transmitted by at least one of the first electronic apparatus and the second electronic apparatus in case that the communication information is information of a video picture, and determining the processing object based on the input track information, the input track information being generated by detecting an input operation of a user by at least one of the first electronic apparatus and the second electronic apparatus;
   executing image recognition to the video picture to divide a static picture into a plurality of regions in case that the communication information is information of the static picture, determining a target region from the plurality of regions based on predetermined criteria, and determining the processing object based on the target region;
   recognizing a dynamic picture to recognize a specific action made by an object in the dynamic picture in the procedure of the communication in case that the communication information is information of the dynamic picture, and determining the processing object based on the specific action.

4. An information processing method applied in a first electronic apparatus, the information processing method comprises:
   determining a processing object based on communication information generated by a communication in a procedure in which the first electronic apparatus executes a multimedia communication with a second electronic apparatus;
   acquiring association information associated with the processing object;
   storing the association information, and
   executing a display based on the association information only when it decides that a predetermined condition is satisfied,
   wherein executing a display based on the association information only when it decides that the predetermined condition is satisfied further includes at least one of the following:
   deciding whether current time satisfies a first predetermined condition after storing the association information, and executing a display based on the association information when it decides that the current time satisfies the first predetermined condition;

deciding whether a network access satisfies a second predetermined condition when the first electronic apparatus executes the network access after storing the association information, and executing the display based on the association information when the network access satisfies the second predetermined condition; and detecting environmental information of the first electronic apparatus after storing the association information, and deciding whether the environmental information satisfies a third predetermined condition, and executing the display based on the association information when the environmental information satisfies the third predetermined condition.

5. The information processing method according to claim 4, wherein acquiring the association information associated with the processing object includes at least one of the following:

transmitting the processing object to a remote server and receiving the association information from the remote server, the association information being information associated with the processing object and obtained by analyzing the processing object by the remote server; and analyzing the processing object to determine the association information.

6. The information processing method according to claim 4, wherein determining the processing object further includes:

determining a plurality of candidate objects based on the communication information;

detecting a selection operation of at least one candidate objects in the plurality of candidate objects by the user; and determining the selected at least one candidate object as the processing object based on the selection operation.

7. The information processing method according to claim 4, wherein the communication information is information of a video picture, and determining the processing object comprises:

detecting an input operation of a user; and determining the processing object in the video picture based on the input operation.

8. The information processing method according to claim 4, wherein detecting the input operation of the user comprises:

detecting an input operation for selecting a region in the video picture; and determining the processing object includes: determining a part of the video picture corresponding to the region in the video picture as the processing object; or detecting the input operation of the user includes: detecting a click operation for clicking the video picture; and determining the processing object includes: executing an image partition to the video picture based on a specific position in the video picture corresponding to the click operation to obtain a partial video picture including the specific position and determining the partial video picture as the processing object; or in case that the video picture is executed the image recognition to determine a plurality of candidate objects, detecting the input operation of the user includes: detecting a selection operation of at least one candidate object in the plurality of candidate objects by the user; and determining the processing object includes: determining the selected at least one candidate objects as the processing object based on the selection operation.

9. An information processing apparatus applied in a server, the information processing apparatus comprises:

a memory that has computer programs stored therein;

a processor in communication with the memory, wherein when the computer programs are executed by the processor, the following processes are performed:

acquiring communication information generated by a communication from at least one of a first electronic apparatus and a second electronic apparatus in a procedure in which the first electronic apparatus communicates with the second electronic apparatus;

determining a processing object based on the communication information;

analyzing the processing object to acquire association information associated with the processing object; and executing an operation based on the association information, wherein the executing comprises at least one of the following processes:

storing the association information;

determining which one of the first electronic apparatus and the second electronic apparatus the association information is appropriate for based on a predetermined strategy; and transmitting the association information to the determined one of the first electronic apparatus and the second electronic apparatus, wherein in case the executing results in transmission of the association information to the first electronic apparatus or the second electronic apparatus based on the predetermined strategy, the executing comprises:

executing semantic analysis to an audio to determine which one of the first electronic apparatus and the second electronic apparatus the association information is appropriate for when the communication information includes information of the audio, and transmitting the association information to the electronic apparatus determined as appropriate of the first electronic apparatus and the second electronic apparatus.

10. The information processing apparatus according to claim 9, wherein in case that the executing results in transmission of the association information to the first electronic apparatus or the second electronic apparatus based on the predetermined strategy, the executing comprises at least one of the following processes:

receiving a request from at least one of the first electronic apparatus and the second electronic apparatus, and transmitting the association information to the electronic apparatus which makes the request in the first electronic apparatus and the second electronic apparatus in response to the request; and transmitting the association information to the electronic apparatus which transmits the communication information in the first electronic apparatus and the second electronic apparatus.

11. The information processing apparatus according to claim 9, wherein the determining comprises at least one of the following processes:

receiving input track information transmitted by at least one of the first electronic apparatus and the second electronic apparatus in case that the communication information is information of a video picture, and determining the processing object based on the input track information, the input track information being generated by detecting an input operation of a user by at least one of the first electronic apparatus and the second electronic apparatus;

executing image recognition to the video picture to divide a static picture into a plurality of regions in case that the communication information is information of the static picture, determining a target region from the plurality of regions based on a predetermined criteria and determining the processing object based on the target region;

recognizing a dynamic picture to recognize a specific action made by an object in the dynamic picture in the procedure of the communication in case that the communication information is information of the dynamic picture and determining the processing object based on the specific action.

12. An information processing apparatus applied in a first electronic apparatus, the information processing apparatus comprises:

a memory that has computer programs stored therein;

a processor in communication with the memory, wherein when the computer programs are executed by the processor, the following processes are performed:

determining a processing object based on communication information generated by a communication in a procedure in which the first electronic apparatus executes a multimedia communication with a second electronic apparatus;

acquiring association information associated with the processing object; and executing an operation based on the association information, wherein the executing comprises storing the association information, and executing a display based on the association information only when it decides that a predetermined condition is satisfied, wherein when the computer programs are executed by the processor at least one of the following processes are performed:

deciding whether current time satisfies a first predetermined condition after storing the association information, and executing a display based on the association information when the current time satisfies the first predetermined condition;

deciding whether a network access satisfies a second predetermined condition when the first electronic apparatus executes the network access after storing the association information, and executing the display based on the association information when the network access satisfies the second predetermined condition; and detecting environmental information of the first electronic apparatus after storing the association information, and deciding whether the environmental information satisfies a third predetermined condition, and executing the display based on the association information when the environmental information satisfies the third predetermined condition.

13. The information processing apparatus according to claim 12, wherein the acquiring comprises at least one of the following processes:

transmitting the processing object to a remote server and receiving the association information from the remote server, the association information being information associated with the processing object and obtained by analyzing the processing object by the remote server; and analyzing the processing object to determine the association information.

14. The information processing apparatus according to claim 12, wherein the determining further comprises:

determining a plurality of candidate objects based on the communication information;

detecting a selection operation of at least one candidate objects in the plurality of candidate objects by the user; and determining the selected at least one candidate objects as the processing object based on the selection operation.

15. The information processing apparatus according to claim 12, wherein the communication information is information of a video picture, and the determining comprises:

detecting an input operation of a user; and determining the processing object from the video picture based on the input operation.

16. The information processing apparatus according to claim 15, wherein the detecting an input operation comprises detecting detect an input operation for selecting a region in the video picture, and the determining comprises determining a partial video picture corresponding to the region in the video picture as the processing object; or the detecting an input operation comprises detecting a click operation for clicking the video picture, and the determining comprises: executing an image partition to the video picture based on a specific position in the video picture corresponding to the click operation to obtain a partial video picture comprising the specific position, and determining the partial video picture as the processing object; or in case that the video picture is executed the image recognition to determine the plurality of candidate objects, the detecting an input operation comprises detecting a selection operation of at least one candidate objects in the plurality of candidate objects and the determining comprises determining the selected at least one candidate objects as the processing object based on the selection operation.

* * * * *